United States Patent
Lockwood et al.

(10) Patent No.: US 7,022,746 B2
(45) Date of Patent: Apr. 4, 2006

(54) VISCOELASTIC POLYURETHANES

(75) Inventors: Robert J. Lockwood, Macomb, MI (US); Verlin D. Poole, Clarkston, MI (US)

(73) Assignee: Huntsman International LLC, Salt Lake City, UT (US)

( * ) Notice: Subject to any disclaimer, the term of this patent is extended or adjusted under 35 U.S.C. 154(b) by 0 days.

(21) Appl. No.: 10/855,102

(22) Filed: May 27, 2004

(65) Prior Publication Data

US 2004/0254256 A1 Dec. 16, 2004

Related U.S. Application Data

(63) Continuation of application No. PCT/US02/38249, filed on Nov. 29, 2002.

(60) Provisional application No. 60/334,299, filed on Nov. 29, 2001.

(51) Int. Cl.
*C08G 18/48* (2006.01)

(52) U.S. Cl. ............... 521/174; 521/914; 528/177

(58) Field of Classification Search ............ 528/77; 521/174, 914

See application file for complete search history.

(56) References Cited

U.S. PATENT DOCUMENTS

| | | |
|---|---|---|
| 3,793,241 A | 2/1974 | Kyle et al. |
| 4,008,189 A | 2/1977 | Van Leuwen et al. |
| 4,259,452 A | 3/1981 | Yukuta et al. |
| 4,762,899 A | 8/1988 | Shikinami |
| 4,789,720 A | 12/1988 | Teffenhart |
| 5,063,253 A | 11/1991 | Gansen et al. |
| 5,369,138 A | 11/1994 | Gansen |
| 5,420,170 A | 5/1995 | Lutter et al. |
| 5,686,502 A | 11/1997 | Murray et al. |
| 5,847,014 A | 12/1998 | Nodelman et al. |
| 5,962,620 A | 10/1999 | Reich et al. |
| 5,994,972 A | 11/1999 | Katsui |
| 6,204,300 B1 | 3/2001 | Kageoka et al. |
| 6,316,514 B1 | 11/2001 | Falke et al. |
| 6,420,447 B1 | 7/2002 | Kittel et al. |

FOREIGN PATENT DOCUMENTS

| | | |
|---|---|---|
| EP | 0 602 059 | 6/1994 |
| EP | 0 934 962 | 8/1999 |

*Primary Examiner*—Rachel Gorr
(74) *Attorney, Agent, or Firm*—Nicole Graham

(57) ABSTRACT

Viscoelastic foams and elastomers based on a reaction system comprising a monomeric polyisocyanate composition, a specified mixture of polyols, and a specified package of additives. The viscoelastic materials offer superior combinations of physical properties, including surprisingly low compression sets. Very soft viscoelastic foams and microcellular elastomers can be conveniently prepared from the reaction system without the necessity of using plasticizers. The reaction system can be processed into useful polymeric articles using a wide range of conventional polyurethane processing methods.

38 Claims, No Drawings

VISCOELASTIC POLYURETHANES

CROSS-REFERENCE TO RELATED APPLICATIONS

This application is a continuation of international application PCT/US02/38249, filed Nov. 29, 2002, and further claims priority to U.S. Provisional Application Ser. No. 60/334,299, filed Nov. 29, 2001.

FIELD OF THE INVENTION

The invention relates to polyurethane flexible and semiflexible foams having viscoelastic or energy absorbing properties and generally low compression sets. More particularly, the inventions relates to foams and microcellular elastomers that are based on amphiphilic segmented polyurethaneureas and polyurethanes prepared from certain combinations of oxyethylene (EO) rich polyether polyols with oxypropylene and/or oxytetramethylene rich polyether polyols of intermediate hydroxyl equivalent weights. The viscoelastic materials exhibit mainly one significant glass transition between about 0° C. and about 50° C. and very low resilience.

BACKGROUND OF THE INVENTION

Soft foams and elastomers that have low resilience and recover slowly when compressed are referred to as viscoelastic. These materials are well known in the art and are useful for their energy absorbing properties. Viscoelastic foams and elastomers are used in a variety of applications to impart cushioning (such as in pillows, wheelchair seats, mattresses, etc.), as sound and vibration damping materials, to impart impact protection, etc. Reactively processable polyurethanes and polyurethaneureas have been particularly useful for the production of viscoelastic materials. Polyurethane chemistry offers unique opportunities for the design of materials with finely tuned physical properties, and for the in-situ fabrication of complex shapes and composite structures.

Reactively processed polyurethane and polyurethaneurea materials are usually made by the combining of two or more liquid chemical streams. The mixing of these liquid streams initiates the polymerization, and, where appropriate, foaming reactions. Shaping and polymerization often occur in the same operation, typically by molding or spraying of the combined reaction mixture while it is still in a liquid state. Polyurethane and polyurethaneurea materials may also be prepared in bulk and then cut into shapes or otherwise post formed after polymerization. A very widely used method for reactive processing of polyurethanes and polyurethaneureas is the two stream approach wherein one stream is a polyfunctional organic isocyanate component (sometimes referred to as the "A-component") and the second stream is a mixture of polyfunctional isocyanate reactive monomers and resins containing catalysts and other additives (sometimes referred to as the "B-component"). The two streams are metered and mixed at a desired weight ratio, determined in part by the stoichiometry of the reaction. Foaming is usually accomplished by including water in the B-component. The water reacts with the polyisocyanate to liberate $CO_2$ and form urea linkages in the polymer, thereby forming a polyurethaneurea polymer structure. Volatile inert organic compounds or inert gasses are sometimes used, either alone or in combination with water, to achieve foaming. Many variations of this basic process are known. Some involve the addition of the water (or other blowing agents), catalysts, and/or other additives as additional chemical streams during processing. Still other known variations involve the physical injection of inert gasses after the point at which the reactive chemical streams are mixed, but before gelling occurs, in order to promote foaming. The degree of foaming may, of course, vary considerably depending upon the level of blowing agent(s) used. Relatively high density elastomeric polyurethane and polyurethaneurea foams are sometimes referred to as microcellular elastomers. Water is also the preferred blowing agent for preparing microcellular elastomers, although the use of water is often supplemented with dissolved or dispersed atmospheric gases such as air or nitrogen.

Most conventional polyurethane and polyurethaneurea solid elastomers, microcellular elastomers, soft foams, and semiflexible foams are phase separated block copolymers comprising distinct phases with high and low glass transition temperatures (Tg's). These high and low Tg phases usually bracket the use temperature range of the material, and the dynamic mechanical spectra of these materials usually show the distinct glass transitions separated by a relatively flat region (or modulus plateau). The low Tg phase in these materials is usually (although not always) derived from a low Tg "block" which is pre-formed and incorporated via the reactive liquid chemical streams. The high Tg phase, by contrast, usually forms during polymerization, due to the formation of urethane and/or urea linkages. The low Tg block (often called the "softblock") is usually derived from a liquid or low melting oligomeric resin that contains a plurality of groups reactive with isocyanate groups. Polyether and polyester polyols are typical examples of these oligomeric resins. In conventional elastomeric polyurethanes and polyurethaneureas the hard (high Tg) and soft (low Tg) phases self assemble during the polymerization reaction and then spontaneously segregate into morphologically distinct phases within the bulk polymer structure. They are said to be "phase separated" materials.

Viscoelastic polyurethanes and polyurethaneureas form a subclass of elastomeric materials and semiflexible materials, characterized by having relatively incomplete or non-existent phase separation. These materials are sometimes referred to as "phase mixed". The phase mixed morphology is characterized by having a single large glass transition, usually within the normal use temperature range of the material (which is typically from about 0° C. to about 50° C.). There may also be additional glass transitions in the dynamic mechanical spectra of these materials, but these, where they exist at all, are much smaller than the main transition. The main glass transition in a phase mixed material is generally quite broad, covering all or most of the normal use temperature range of the material. This main transition accounts for the unique energy absorbing (low resilience) properties that are characteristic of viscoelastic polyurethanes and polyurethaneureas. Block polyurethanes and polyurethaneureas that are well phase separated are, by contrast, highly resilient and have poor energy absorption properties within the modulus plateau region (between the distinct hard and soft phase glass transitions).

The most effective methods for achieving viscoelastic properties in polyurethane and polyurethaneurea materials involve interfering with the phase separation of the polymer segments in some way. These methods, in effect, blur the interface between the hard and soft blocks. Some specific methods that have been used in the art include relatively heavy crosslinking, reducing the equivalent weight of the soft segment precursor (in effect, reducing the length of the elastically active chains), using mixtures of soft segment precursors (polyols) comprising relatively low, medium, and high equivalent weight components, the addition of high levels of plasticizers, the addition of high levels of particulate fillers, and various combinations of these methods. Each of these prior art methods has undesirable tradeoffs, especially when relatively soft materials are required: Excessive crosslinking can severely reduce important mechanical properties, such as elongation, tear resistance, and tensile strength. It may also cause high compression sets and undesirably high hardness. Reduction of the length of the elastically active chains and the use of polyol mixtures with high/medium/low equivalent weights may also cause excessively high compression sets. It is important that a viscoelastic material be capable of recovering its original shape (albeit slowly) when compressed or otherwise distorted. It should not take a permanent set. Therefore, low compression set, both under humid aged and dry conditions, is a valuable physical property characteristic for viscoelastic polyurethanes and polyurethaneureas. Finally, the use of high levels of plasticizers or fillers also detracts from mechanical properties related to strength, such as tensile strength and tear resistance. Very high levels of these additives, typically well over 30% by weight, and often more than 100% of the weight of the polymer, are required in order to achieve useful viscoelastic performance. Filler loadings this high can result in excessive hardness and weight. Plasticizers, when used at such extreme levels, can migrate and cause staining as well as toxicity concerns and odor problems. Viscoelastic polyurethane and polyurethaneurea foams should be predominantly open celled in order to avoid shrinkage. Some of the known techniques used to promote viscoelastic behavior, such as the use of polyols with low to medium range equivalent weights, often interfere with the polyurea (hard segment) precipitation or micro-domain formation. This can in turn interfere with spontaneous cell opening. Although it is sometimes still possible to achieve cell opening by crushing the foam, this is not always practical and it adds a costly extra step to the process.

There is a noticeable lack of prior art references to flexible polyurethane or polyurethaneurea foam formulations based predominantly on combinations of PO-rich and EO-rich flexible polyols of intermediate equivalent weights. PO-rich polyols are generally regarded as hydrophobic, whereas EO-rich polyols are considered relatively hydrophilic. Polyols that are very high in PO may be incompatible with polyols very high in EO, such that mixtures of these polyols often phase separate. It is particularly difficult to process such mixtures into flexible or semiflexible foams, in as much as the incipient foams have a strong tendency to collapse.

Therefore, there is a need in the industry for improved soft and also semi-rigid (semi-flexible) viscoelastic polyurethanes and polyurethaneureas that are reactively processable, have low compression set values, good strength and elongation properties, and do not require the use of high loadings of plasticizers or fillers. There is a further need for reactively processable viscoelastic polyurethane and polyurethaneurea foams which, in addition to having all the characteristics noted above over a wide range of foam densities, are predominantly open celled, cover a very wide hardness range, and do not require crushing.

SUMMARY OF THE INVENTION

Viscoelastic polyurethane-based elastomers, soft foams, and semiflexible foams that address the needs noted above are surprisingly attained by using a reaction system comprising:

(A) an organic monomeric polyisocyanate composition having a number averaged functionality of organically bound isocyanate groups of from 2 to 3 and a total concentration of organically bound isocyanate groups of from 25 to 50% by weight;

(B) an isocyanate reactive component comprising:
  (i) from 0 to 12% water;
  (ii) from 30 to 70% of a polyoxyethylene based polyol having a combined nominal functionality of primary and secondary aliphatically bound hydroxyl groups of 2 to 4, a number averaged molecular weight of from 400 to 1500, and a number averaged equivalent weight of the combined primary and secondary aliphatically bound hydroxyl groups of from 200 to 750, wherein the polyoxyethylene based polyol is composed of greater than 70% by weight of oxyethylene units and at least 50 mole percent of the aliphatically bound hydroxyl groups are primary hydroxyl groups;
  (iii) from 30 to 70% by weight of a second polyoxyalkylene based polyol having a combined nominal functionality of primary and secondary aliphatically bound hydroxyl groups of 2 to 4, a number averaged molecular weight of from 400 to 1500, and a number averaged equivalent weight of the combined primary and secondary aliphatically bound hydroxyl groups of from 200 to 750, wherein the second polyoxyalkylene based polyol is composed of greater than 70% by weight of oxyalkylene units selected from the group consisting of oxypropylene units, oxytetramethylene units, and combinations of oxypropylene and oxytetramethylene units;
  (iv) from 0 to 20% of a polyoxypropylene or polyoxyethylene-polyoxypropylene polyol different from B(ii) or B(iii), having a combined nominal functionality of primary and secondary aliphatically bound hydroxyl groups of 2 to 4, and a number averaged equivalent weight of the combined primary and secondary aliphatically bound hydroxyl groups of from greater than 750 to 4000, wherein the polyoxypropylene or polyoxyethylene-polyoxypropylene polyol contains a weight ratio of oxyethylene to oxypropylene units of from 0:100 to 90:10; and
  (v) from 0 to 15% of an organic polyol having a combined isocyanate reactive group functionality of 2 to 4 and an equivalent weight of isocyanate reactive groups of from 30 to less than 200, wherein the isocyanate reactive groups are limited to one or more members selected from the group consisting of primary aliphatic alcohol groups, secondary aliphatic alcohol groups, and aliphatic secondary amine groups and at least two of the isocyanate reactive groups are alcohol groups wherein the weight ratio of B(ii) to B(iii) is from 70:30 to 30:70, and the combined weight of B(ii) and B(iii) constitutes at least 53% by weight of the isocyanate reactive component;

(C) an optional surfactant;

(D) a catalyst; and (E) an optional additive selected from the group consisting of dyes, pigments, internal mold release agents, physical blowing agents, chemical blowing agents, fire retardants, fillers, reinforcements, plasticizers, smoke suppressants, fragrances, antistatic agents, biocides, antioxidants, light stabilizers, adhesion promoters, and mixtures of these wherein the ratio of organically bound isocyanate groups to the total of isocyanate reactive groups in the reaction system varies from greater than 0.50 to 110.

The reaction system is particularly well suited for the preparation of flexible viscoelastic foams having free rise densities of 5.5 pounds per cubic foot or less. The preferred reaction systems comprise water as a blowing agent. Water preferably contributes all or most of the foam expansion. Most preferably, water is the sole blowing agent. The reaction system may optionally also contain minor amounts (i.e. up to 10% by weight of the total system) of reactive (polymer forming) species other than those specified. These may include, for example, species containing primary and/or secondary organically bound amines, polyester polyols, or other kinds of polyols different from those described in (B) above.

In another embodiment, the invention relates to viscoelastic polymeric articles that are produced using the reaction system.

DETAILED DESCRIPTION OF THE INVENTION

In one embodiment, the invention relates to a reaction system comprising:
(A) an organic monomeric polyisocyanate composition having a number averaged functionality of organically bound isocyanate groups of from 2 to 3 and a total concentration of organically bound isocyanate groups of from 25 to 50% by weight;
(B) an isocyanate reactive component comprising:
  (i) from 0 to 12% water;
  (ii) from 30 to 70% of a polyoxyethylene based polyol having a combined nominal functionality of primary and secondary aliphatically bound hydroxyl groups of 2 to 4, a number averaged molecular weight of from 400 to 1500, and a number averaged equivalent weight of the combined primary and secondary aliphatically bound hydroxyl groups of from 200 to 750, wherein said polyoxyethylene based polyol is composed of greater than 70% by weight of oxyethylene units, and at least 50 mole percent of the aliphatically bound hydroxyl groups are primary hydroxyl groups;
  (iii) from 30 to 70% by weight of a second polyoxyalkylene based polyol having a combined nominal functionality of primary and secondary aliphatically bound hydroxyl groups of 2 to 4, a number averaged molecular weight of from 400 to 1500, and a number averaged equivalent weight of the combined primary and secondary aliphatically bound hydroxyl groups of from 200 to 750, wherein said second polyoxyalkylene based polyol is composed of greater than 70% by weight of oxyalkylene units selected from the group consisting of oxypropylene units, oxytetramethylene units, and combinations of oxypropylene and oxytetramethylene units;
  (iv) from 0 to 20% of a polyoxypropylene or polyoxyethylene-polyoxypropylene polyol different from B(ii) or B(iii), having a combined nominal functionality of primary and secondary aliphatically bound hydroxyl groups of 2 to 4, and a number averaged equivalent weight of the combined primary and secondary aliphatically bound hydroxyl groups of from greater than 750 to 4000, wherein said polyol contains a weight ratio of oxyethylene to oxypropylene units of from 0:100 to 90:10; and
  (v) from 0 to 15% of an organic polyol having a combined isocyanate reactive group functionality of 2 to 4, and an equivalent weight of isocyanate reactive groups of from 30 to less than 200, wherein said isocyanate reactive groups are limited to one or more members selected from the group consisting of primary aliphatic alcohol groups, secondary aliphatic alcohol groups, and aliphatic secondary amine groups; and at least two of said isocyanate reactive groups are alcohol groups wherein the weight ratio of B(ii) to B(iii) is from 70:30 to 30:70, and the combined weight of B(ii) and B(iii) constitutes at least 53% by weight of the isocyanate reactive component;
(C) an optional surfactant;
(D) a catalyst; and
(E) an optional additive selected from the group consisting of dyes, pigments, internal mold release agents, physical blowing agents, chemical blowing agents, fire retardants, fillers, reinforcements, plasticizers, smoke suppressants, fragrances, antistatic agents, biocides, antioxidants, light stabilizers, adhesion promoters, and mixtures of these wherein the ratio of organically bound isocyanate groups to the total of isocyanate reactive groups in the reaction system varies from greater than 0.50 to 1.10.

In one preferred embodiment, the combined nominal functionality of primary and secondary aliphatically bound hydroxyl groups of at least one of B(ii) and B(iii) is greater than 2. In another preferred embodiment, the combined nominal functionality of primary and secondary aliphatically bound hydroxyl groups of at least one of B(ii) and B(iii) is 3. In a yet more preferred embodiment, the combined nominal functionality of primary and secondary aliphatically bound hydroxyl groups of both of B(ii) and B(iii) is 3. In still another preferred embodiment, the number averaged isocyanate (—NCO) group functionality of the monomeric polyisocyanate composition is greater than 2, and more preferably greater than 2.1. In yet another preferred embodiment, the mole ratio of organic primary —OH groups to organic secondary —OH groups in the isocyanate reactive composition is in the range of from 70:30 to 30:70. In one very highly preferred embodiment, B(iii) contains mostly secondary —OH groups. In another particularly preferred embodiment, B(iii) is based predominantly, on a weigh basis, of oxypropylene units. In an even more preferred embodiment, the oxyalkyene units in the structure of B(iii) are essentially all oxypropylene units.

The reaction system may optionally also contain minor amounts of up to 10% by weight of the total reaction system (but typically zero to less than 5% by weight of the total reaction system) of reactive (polymer forming) species other than those specified. These may include, for example, species containing primary and/or secondary organically bound amines, polyester polyols, or other kinds of polyols different from those described in (B) above. In a preferred embodiment, the reaction system is essentially free of reactive species other than those specified.

In particularly preferred embodiments, the reaction system contains from 0.1 to 5% by weight, even more preferably from 0.25 to 2.5% by weight, relative to the total reaction system weight, of a surfactant, wherein the surfactant contains a plurality of siloxane linkages. In the most highly preferred embodiments, the combined level of optional additives (E) are less than 30% by weight of the total reaction system.

In another preferred embodiment, the viscoelastic polyurethane based materials obtained from the reactively processable system are flexible or semiflexible foams having a free rise density of from 2 to less than 4 pounds per cubic foot, made with water as the principle blowing agent (such that the water contributes most of the expansion). In yet another preferred embodiment, the viscoelastic polyurethane based materials obtained from the reaction system are microcellular elastomers (i.e. relatively high density elastomeric foams) having a free rise density of from greater than 5.5 up to 15 pounds per cubic foot, made with water as the principle blowing agent (such that the water contributes most of the expansion).

In still another preferred embodiment, all the organic polyols in the reaction system are essentially free of species containing hydroxyl groups other than primary or secondary aliphatically bound hydroxyl groups.

In still another preferred embodiment, the combined level of plasticizers and particulate fillers of all kinds in the reaction system is less than 20% by weight of the reaction system. In still another preferred embodiment, the reaction system comprises a compatible blend comprising at least 60% by weight, preferably at least 90% by weight, of B(ii) and B(iii) present in the reaction system, wherein the compatible blend remains free of bulk separation for a sufficiently long period of time to permit the processing of the blend without separation taking place during the processing operation. The degree of compatibility required for effective processing of this blended polyol component will of course vary depending upon the mode of processing and the apparatus used, as is well known in the art.

In still another preferred embodiment, the organic monomeric polyisocyanate remains liquid and free of solids on standing at 25° C. for at least 3 hours and has a viscosity at 25° C. of less than 1000 cps.

In another embodiment, the invention relates to viscoelastic polymeric articles produced using the reaction system, wherein the polymeric articles minimally contain a plurality of urethane groups. The viscoelastic polymeric articles may optionally contain other kinds of chemical groups formed from the reactions of isocyanates, such groups include, but are not limited to, urea groups, isocyanurate groups, biuret groups, allophanate groups, carbodiimide groups, uretonimine groups, oxazolidone groups, and uretidine-dione (dimer) groups. Urethane and urea linkages are most common.

The term "polyurethane", when used herein, will be understood to minimally encompass both polyurethanes and polyurethaneureas, unless otherwise specified. The term "polyisocyanate", as used herein, encompasses diisocyanates and species with numbers of isocyanate groups greater than two. The terms "essentially only" and "essentially all" as used herein shall be understood to mean greater than (or to an extent greater than) 99% by weight, preferably greater than 99.5% by weight, more preferably greater than 99.9% by weight, and most preferably greater than 99.99% by weight, in all contexts where it is used, unless specifically indicated otherwise. The term "essentially free", as used throughout this document, shall be understood to mean less than 1% by weight, preferably less than 0.5% by weight, more preferably less than 0.1%, and most preferably less than 0.01% by weight, in all contexts where it is used unless specifically indicated otherwise.

Monomeric Polyisocyanate Composition

The term "organic monomeric polyisocyanate composition" used herein denotes the monomeric, or base, isocyanate functional species that go into the reaction system. These do not include prepolymers. Although it is within the scope of the invention to use prepolymers, these optional prepolymer species are prepared by reaction of the monomeric polyisocyanate, in whole or in part, with a portion or portions of the isocyanate reactive species noted in the general formulation, in a step prior to the final polymerization reaction. The prepolymer method is an optional method of processing the reaction system noted above, but the polyols used in the preparation of the optional prepolymers are considered to be part of the reaction system. A preferred class of optional prepolymers are prepared by reacting at least a portion of B(iv) with the base polyisocyanate composition to form a mixture of isocyanate terminated urethane prepolymeric species dissolved in residual monomeric polyisocyanate species. These preferred optional prepolymers have a viscosity at 25° C. of less than 5000 cps, preferably less than 1000 cps, and are storage stable solids free liquids at 25° C. for at least 24 hours, preferably these are storage stable liquids for at least 30 days at 25° C. and remain optically clear under these conditions. These preferred optional prepolymers remain low in viscosity, preferably less than 4000 cps (measured at 25° C.), after 30 days storage at 25° C., and still more preferably less than 1000 cps after 30 days storage at 25° C. The most preferred among this class of prepolymers have isocyanate group concentrations by weight of from 20 to 30%, most preferably from 23 to 28%. The term prepolymer as used herein denotes an isocyanate group terminated species formed from the reaction of a molar excess of a base polyisocyanate with a compound containing active hydrogen atoms, said active hydrogen containing compound most preferably being a polyol. Prepolymers may be formed as a solution in excess unreacted base (monomeric) polyisocyanate, but these solutions are still generically referred to as prepolymers. The term prepolymer as used herein shall be understood to encompass both the "pure" prepolymeric species and the solutions of said prepolymeric species in unreacted monomeric polyisocyanate.

The preferred base (monomeric) polyisocyanates contain essentially only organically bound —NCO groups and are essentially free of isocyanate species containing less than 2 isocyanate groups per molecule. More preferred are aromatic polyisocyanates that contain essentially only species having aromatically bound isocyanate (—NCO) groups, most preferably aromatic isocyanate species having solely aromatically bound isocyanate (—NCO) groups.

Monomeric polyisocyanates which may be used include aliphatic isocyanates such as 1,6-hexamethylene diisocyanate, isophorone diisocyanate, xylylene diisocyanate, tetramethylxylylene diisocyanate, dicyclohexylmethane diisocyanates, mixtures of these, and the like. However, aromatic polyisocyanates are more preferred. Examples of aromatic polyisocyanates that may be include the naphthalene diisocyanates, the toluene diisocyanates, and the polyisocyanates of the MDI series. The MDI series isocyanates are the most preferred. Particularly preferred MDI series polyisocyanates that may be used include 4,4'-MDI, 2,4'-MDI, 2,2'-MDI, the tri and higher functionality methylene bridged polymethylene polyphenyl polyisocyanate oligomers as obtained from the phosgenation of condensation products of aniline with formaldehyde, and mixtures of these. Monomeric polyisocyanates that have been partially self-reacted to form carbodiimides, uretonimines, and/or isocyanurates may optionally be included in the base polyisocyanate composition. Mixtures of different types of monomeric isocyanates may be used, such as, for example, mixtures of the MDI series polyisocyanates and one or more isomers of toluene diisocyanate. The most preferred base isocyanate compositions are essentially free of isocyanate containing species other than the MDI series isocyanates and partially self-reacted derivatives of said MDI series isocyanates as discussed above. The base isocyanate preferably remains liquid at 25° C. and free of solids on standing for at least 3 hours and has a viscosity of less than 1000 cps at 25° C., preferably less than 500 cps, and more preferably less than 250 cps at 25° C.

The monomeric polyisocyanate component (A) may of course be a single compound, but is more often a mixture of several monomeric polyisocyanate species and optionally the carbodiimide/uretonimine or isocyanurate derivatives of one or more thereof. The number averaged isocyanate (—NCO) group functionality of the monomeric base isocyanate is from 2.00 to 3.00; preferably the range is between greater than 2.00 to 2.70; more preferably 2.01 to 2.70; still more preferably 2.05 to 2.50; even more preferably from 2.05 to 2.40, and most preferably from greater than 2.10 to 2.30. The percent by weight concentration of isocyanate (—NCO) groups in the monomeric base polyisocyanate component (A) is from 25 to 50% by weight; preferably 26 to 48%; more preferably 27 to 40%; still more preferably 28 to 35%; and most preferably 28 to 33.6% by weight.

Examples of some specific monomeric polyisocyanate compositions preferred for use include, but are not limited to:

1) A pure 4,4'-MDI which has been partially uretonimine/carbodiimide modified to produce a liquid isocyanate product having an NCO group content of 29.3% by weight and a number averaged NCO group functionality of about 2.12. A product of this type is commercially available from Huntsman Polyurethanes as RUBINATE® 1680 isocyanate.
2) An 80/20 mixture of 4,4'-MDI and 2,4'-MDI, containing traces of 2,2'-MDI; which has been partially uretonimine/carbodiimide modified to produce a liquid isocyanate product having an NCO group content of about 31% by weight and a number averaged NCO group functionality of about 2.03. A product of this type is commercially available from Huntsman Polyurethanes as RUBINATE® 1208 isocyanate.
3) A 60/40 w/w mixture of an 80/20 blend of 4,4'-MDI and 2,4'-MDI containing traces of the 2,2'-MDI isomer, with polymeric (crude) MDI. This mixture, which is commercially available from Huntsman Polyurethanes as RUBINATE® 1245 isocyanate, has an NCO group content of about 32.8% by weight and has a number averaged NCO group functionality of about 2.3. This product is a liquid at 25° C. with a viscosity at 25° C. of less than 45 cps. The polymeric (crude) MDI from which this blend was prepared is the phosgenation product of a crude aniline+formaldehyde condensate. This polymeric MDI ingredient contains about 50% by weight of diisocyanatodiphenylmethane isomers and about 50% of polymethylene polyphenyl polyisocyanate oligomers of functionality 3 or higher. The diisocyanatodiphenylmethane fraction in this polymeric MDI comprises about 96% of the 4,4'-MDI isomer, about 4% of the 2,4'-MDI isomer, and traces of the 2,2'-MDI isomer. The polymeric MDI ingredient used in preparing this mixture has an NCO group content of about 31.5% by weight and a number averaged NCO group functionality of about 2.7.
4) A 90/10 w/w blend of the isocyanate mixture #3 above, and an 80/20 mixture of 2,4-toluene diisocyanate with 2,6-toluene diisocyanate. This blend is a liquid at 25° C.

Isocyanate Reactive Component

The preferred components of the isocyanate reactive component include water and polyols containing primary and/or secondary —OH groups. The most preferred polyols are polyether polyols derived from the reaction of cyclic alkylene oxides with a polyfunctional initiator. The most preferred polyether polyols are those based on ethylene oxide and/or propylene oxide as the predominant alkylene oxides used in their synthesis. Individual polyols may optionally contain other alkylene oxide residues in addition to ethylene oxide (EO), propylene oxide (PO), and/or tetramethylene oxide. However, it is preferred that these other alkylene oxide residues (if present at all) account for less than 10% by weight of each polyol, preferably less than 5% by weight, more preferably less than 1%, still more preferably less than 0.5% and even more preferably less than 0.1% by weight of the alkylene oxide residues present in each polyol. In the most preferred embodiments, each of the polyether polyols is essentially free of alkylene oxide residues other than EO and/or PO. In certain specialized embodiments, however, one of the polyols, specifically B(iii), may be based predominantly on tetramethylene oxide units or on combinations of tetramethylene oxide and propylene oxide units.

The term "nominal functionality" applied to polyols, as used herein, denotes the expected functionality of the polyol based upon the raw materials used in its synthesis. The nominal functionality may differ slightly form actual functionality, but the difference may usually be ignored. The nominal functionality of a polyoxyalkylene polyether polyol is the functionality of the initiator. This is particularly true for polyether polyols that are based predominantly on one or more of the cyclic alkylene oxides, such as EO, PO, and tetramethylene oxide. The nominal functionality of a pure compound is the same as its absolute functionality. If a mixed initiator is used, then the nominal functionality of the polyol is the number averaged functionality of the mixed initiator.

Each of B(ii)–B(v) may individually be a single polyol or a mixture of polyols. Whenever a mixture of polyols is used for B(ii)–B(v), the individual polyols in the mixture should each meet the specification disclosed herein for that polyol type, and the relative amount of the mixed polyol used in the reaction system should conform to the ranges of amounts disclosed for the appropriate polyol type.

The term "equivalent weight" as applied to the polyol species disclosed herein shall be understood to denote the number averaged molecular weight of the specified polyol divided by its nominal functionality of primary and/or secondary aliphatically bound —OH groups, unless otherwise specified. Alternatively, the measured value of hydroxyl equivalent weight may be used, that being 56100/OH# (wherein OH# is the measured hydroxyl number of the polyol), if the specified polyol is essentially free of species containing —OH groups other than primary and/or secondary aliphatically bound —OH groups and primary or secondary amine groups.

The sum of B(i)–B(v) must total 100% by weight ("Component B"). The sum of B(ii)–B(v) constitutes greater than or equal to 53% by weight of the total Component B, preferably greater than 53%, more preferably greater than 55%, still more preferably greater than 65%, even more preferably greater than 75%, and most preferably greater than 85% by weight of Component B.

Each of B(ii)–B(v) in Component B should be essentially free of species containing hydroxyl groups other than aliphatically bound primary or secondary alcoholic hydroxyl groups. More preferably, B(ii)–B(iv) are also essentially free of species containing other types of active hydrogen groups capable of reacting with the isocyanate component under the conditions of processing. In an especially preferred embodiment, the mole ratio of aliphatically bound primary —OH groups to aliphatically bound secondary —OH groups in the combination of isocyanate reactive components is in the range of from 70:30 to 30:70.

Component B(i)

Component B(i) is water. The amount of water should be 0 or very close to 0 if it is desired to make a solid elastomer. If a solid elastomer is desired, the level of water in the formulation should be 0.15% by weight or less, preferably less than 0.1%, more preferably less than 0.05%, and most preferably less than 0.01% by weight of the total Component B. If a foam (cellular or microcellular material) is desired then water is the most preferred foaming agent. Ideally, water is the sole foaming agent. A preferred level of water for making flexible foam is in the range of from greater than 0.15% to 10%, preferably 0.5 to 7%, more preferably 2 to 5%, still more preferably 2 to 4%, even more preferably 2.5% to less than 4%, and most preferably 2.8 to 3.5% by weight of Component B. If a high density flexible foam (microcellular elastomer) is desired, then the preferred blowing agent is again water. An example of a preferred water level for use in a microcellular elastomer system is from greater than 0.15% by weight to less than 0.5% by weight of Component B. Another example of a preferred range of water concentrations for microcellular elastomers is from 0.2% to 0.45% by weight of Component B. Yet another example of a preferred range of water concentrations for a microcellular elastomer system is from 0.25% to 0.4% of Component B by weight.

Component B(ii)

Component B(ii) is a polyoxyethylene based polyol containing greater than 70% by weight of oxyethylene units, preferably at least 75% oxyethylene units, more preferably at least 80% oxyethylene units, still more preferably at least 90%, and even more preferably at least 93% oxyethylene units by weight. Most preferably, B(ii) is essentially free of oxyalkylene units other than oxyethylene units. B(ii) has a nominal functionality of primary and/or secondary aliphatically bound —OH groups of 2 to 4, preferably 2 to 3, and most preferably 3. B(ii) is preferred to be essentially free of species containing active hydrogen groups other than hydroxyl groups. The number averaged equivalent weight of B(ii), relative to the combined total of aliphatically bound primary and secondary —OH groups in the polyol, is from 200 to 750; preferably from 280 to 620; more preferably from 300 to 550, still more preferably from 350 to 500, and most preferably from 400 to less than 500. The number averaged molecular weight of B(ii) is from 400 to 1500, preferably from 500 to 1500, more preferably from 600 less than 1500, even more preferably from 700 to less than 1500, and most preferably from 800 to less than 1500. At least 50 mole percent, and preferably greater than 50 mole percent, of the hydroxyl groups in B(ii) are primary aliphatically bound hydroxyl groups. More preferably at least 75 mole percent, still more preferably at least 80 mole percent, even more preferably at least 90 mole percent, and most preferably 100 mole percent of the hydroxyl groups in B(ii) are primary aliphatically bound hydroxyl groups. A non-limiting example of a specific polyol of the B(ii) type is DALTOCEL® F-526 polyol, which is made by ethoxylation of glycerine, is free of oxyalkylene residues other than oxyethylene, contains only primary aliphatically bound —OH groups, has a nominal —OH functionality of 3, a number average —OH equivalent weight of 442, and is commercially available from Huntsman Polyurethanes.

Component B(iii)

Component B(iii) is a second polyoxyalkylene based polyol that is different than B(ii). B(iii) contains greater than 70% by weight of oxyalkylene units selected from the group consisting of oxypropylene units, oxytetramethylene units, and combinations of oxypropylene and oxytetramethylene units. Preferably, B(iii) contains greater than 80% by weight, more preferably greater than 85% by weight, and most preferably greater than 90% by weight of oxyalkylene units selected from the group consisting of oxypropylene units, oxytetramethylene units, and combinations of oxypropylene and oxytetramethylene units. In a preferred embodiment, B(iii) consists predominantly, on a weight basis, of oxypropylene units. In one very particularly preferred embodiment, B(iii) is essentially free of oxyalkylene units other than oxypropylene units. B(iii) has a nominal functionality of primary and/or secondary aliphatically bound —OH groups of 2 to 4, preferably 2 to 3, and most preferably 3. B(iii) is preferred to be essentially free of species containing active hydrogen groups other than hydroxyl groups. B(iii) may optionally be EO (oxyethylene) tipped in order to increase the extent of primary —OH termination therein, provided that the oxypropylene and/or oxytetramethylene levels are as defined above. Primary —OH groups are however less preferred in polyol component B-iii. Secondary —OH groups are more preferred. B(iii) should more preferably contain mostly secondary —OH groups, and most preferably all secondary —OH groups.

In a specialized, but generally less preferred embodiment, B(iii) may optionally contain minor amounts of randomly distributed EO (oxyethylene) units, provided that the oxypropylene and/or oxytetramethylene levels are as defined above. It is preferred that at least 90 mole percent, more preferably at least 95 mole percent, and most preferably 100 mole percent of the hydroxyl groups in B(iii) are secondary aliphatically bound hydroxyl groups.

The number averaged equivalent weight of B(iii), relative to the combined total of aliphatically bound primary and secondary —OH groups in the polyol, is from 200 to 750, preferably from 280 to 620, more preferably from 300 to 550, still more preferably from 350 to 500, and most preferably from 400 to less than 500. The number averaged molecular weight of B(iii) is from 400 to 1500, preferably from 500 to 1500, more preferably from 600 less than 1500, even more preferably from 700 to less than 1500, and most preferably from 800 to less than 1500. A non-limiting example of a specific polyol of the B(iii) type is JEFFOL® G30-167 polyol, which is made by propoxylation of glycerine, is free of oxyalkylene residues other than oxypropylene, contains mostly secondary aliphatically bound —OH groups, has a nominal —OH functionality of 3, a number average —OH equivalent weight of 336, and is commercially available from Huntsman Polyurethanes.

At least one of B(ii) and B(iii) should preferably have a nominal functionality of greater than 2. Most preferably, both B(ii) and B(iii) are nominal triols. These functionalities pertain to the combined total of primary and secondary aliphatically bound —H groups present in the individual polyols.

The weight ratio of B(ii) to B(iii) in the reaction system is preferably from 70:30 to 30:70, preferably in the ratio of from 65:35 to 35:65, more preferably from 60:40 to 40:60, still more preferably from 55:45 to 45:55, and most preferably about 1:1.

Component B(iv)

Component B(iv) is an optional polyol different from B(ii) and B(iii), but its use in the reaction system with B(ii) and B(iii) may sometimes be preferred, especially in the preparation of softer foams. The level of B(iv) is between 0 and 20% by weight of Component B. When used, the level of B(iv) is more preferably from about 2% to about 15%, still more preferably from about 4% to about 12%, and most preferably from about 5% to 10% of the weight of Component B. B(iv) has a nominal functionality of aliphatically bound primary and secondary hydroxyl groups (total) of 2 to 4, and more preferably 2 to 3. B(iv) has a number averaged equivalent weight of aliphatically bound primary and secondary hydroxyl groups present (combined) of from greater than 750 to about 4000, but more preferably from greater than 750 to about 3000, still more preferably from about 800 to about 2000, and most preferably from about 1000 to 1800. B(iv) is selected from the group consisting of polyoxypropylene based polyols, polyoxyethylene-polyoxypropylene based polyols, and mixtures thereof that are distinct from the other polyols in the system, most notably B(ii) and B(iii). B(iv) is preferred to be essentially free of oxyalkylene units other than oxyethylene or oxypropylene. The weight ratio of oxyethylene to oxypropylene units in B(iv) is from 0:100 to 90:10, but is preferably from 5:95 to 90:10, and more preferably from 10:90 to 30:70. Primary —OH groups are generally more preferred, but secondary —OH groups are suitable. The oxyethylene and oxypropylene units in B(iv) may be randomly distributed, or they may alternatively be distributed as separate blocks of oxyethylene and oxypropylene residues or any combination of random and block distribution. In a preferred embodiment of the invention, all or most of the oxyethylene units are present in the polyol as a terminal cap at the ends of the polyether chains, thereby ensuring a high proportion of primary —OH termination.

It is within the scope of the invention to use a mixture of polyols for B(iv), wherein all the polyols in the mixture individually conform to the structural limitations defined herein for B(iv). In this embodiment, B(iv) may suitably be a combination of a polyoxpropylene based polyol and a polyoxypropylene-polyoxyethylene based polyol. In this optional combination of polyols, the weight ratio of oxyethylene to oxypropylene units in the polyoxypropylene-polyoxyethylene polyol combination should be from: 5:95 to 90:10, and more preferably from 10:90 to 30:70.

A non-limiting example of a specific polyol of the B(iv) type is JEFFOL® G 31-35 polyol, which is made by propoxylation and ethoxylation of glycerol, is free of oxyalkylene residues other than oxypropylene and oxyethylene, contains only primary and secondary aliphatically bound —OH groups, has a nominal —OH functionality of 3, has a number average —OH equivalent weight of 1603, is characterized by having a weight ratio of oxyethylene to oxypropylene residues of about 17:83, and is commercially available from Huntsman Polyurethanes. The oxyethylene units in the JEFFOL® G 31-35 polyol are located predominantly at the chain ends, resulting in a polyol that is predominantly primary —OH terminated.

It is within the scope of the invention to incorporate all or any portion of B(iv) into the reaction system by pre-reaction with an excess of polyisocyanate (on an equivalents basis), to form isocyanate terminated prepolymer species. In other embodiments, B(iv), or any portion thereof, may be used directly in admixture with the other polyols in the isocyanate reactive component of the reaction system. As noted herein, the use of isocyanate prepolymers is optional. However, when it is desired to use isocyanate prepolymers, B(iv) (or portions thereof) are a preferred source of polyol(s) for the preparation of the prepolymers. The use of prepolymers is sometimes helpful in improving the liquid stability of the final polyisocyanate component used in processing the system and for adjusting the weight ratios of reactive streams during processing of the inventive reaction systems into polymeric articles.

Component B(v)

Component B(v) is also an optional polyol. It is a relatively low molecular weight polyol, or mixture of relatively low molecular weight polyols, that are often referred to in the art as "chain extenders" and "crosslinkers". These two terms are sometimes used interchangeably in the art. However, within the context of this invention a "chain extender" will be understood to be a difunctional isocyanate reactive molecular species of the B(v) type, and a "crosslinker" will be understood to be a molecular species of type B(v) having an isocyanate-reactive functionality of 3 or greater. B(v) may be a pure compound, in which case the isocyanate reactive group functionality of the polyol is its absolute functionality, its isocyanate-reactive equivalent weight and its molecular weight are also absolute. However, if B(v) is an oligomeric material (or if it is a mixture), then the isocyanate reactive group functionality, the isocyanate reactive equivalent weight, and the molecular weight of B(v) are all understood to be number averaged. B(v) may sometimes comprise alkanolamine species that contain isocyanate reactive amine groups in addition to primary and/or secondary aliphatically bound alcoholic —H groups. A particularly preferred class of these alkanolamine polyols is alkanolamines containing one or two aliphatic secondary amine groups. Specific but non limiting examples of the most preferred reactive amine containing alkanolamine polyols that are suitable for use as B(v) include diethanolamine and diisopropanolamine. These and other secondary amine containing alkanolamines are highly reactive and, as such, should preferably not be used at levels totaling higher than 5% by weight of Component B, more preferably at levels totaling not higher than 3%, still more preferably at levels not higher than 2%, and most preferably at levels of 1% or less of Component B. The functionality and equivalent weight of B(v) with respect to isocyanate reactive groups is determined from the sum of all such groups present in B(v). The types of isocyanate reactive groups in B(v) is limited to one or more members selected from the group consisting of primary aliphatic alcohol groups, secondary aliphatic alcohol groups, and secondary aliphatic amine groups. B(v) is essentially free of species containing other kinds of isocyanate reactive functional groups. B(v) must contain at least two isocyanate reactive alcohol groups. It may optionally contain up to two secondary aliphatic amine groups. B(v) preferably contains 0 to 1 secondary aliphatic amine groups. The overall isocyanate-reactive group functionality of B(v) is 2 to 4, preferably 2 to 3, and most preferably 2. This overall isocyanate-reactive group functionality of B(v) includes both the —H groups and any secondary amine groups present in the molecule. The isocyanate-reactive equivalent weight of B(v) is from 30 to less than 200, preferably from 30 to 150, more preferably form 30 to 100, and most preferably from greater than 30 to less than 95. This equivalent weight is equal to the molecular weight of B(v) divided by the overall isocyanate-reactive group functionality (as defined above). If B(v) is a mixture of different polyols then the individual polyols in the mixture should each conform to the specifications for B(v). The sum of all polyols of type B(v) in the formulation of Component B should be 15% by weight or less of Component B.

If Component B contains little or no water (0.15% or less by weight of Component B) and is otherwise suitable for preparing a solid elastomer, then the level of B(v) is preferred to be in the range of from 5 to 15%, more preferably 6 to 14%, and still more preferably 7% to 12% by weight of Component B. If Component B contains from greater than 0.15% to less than 0.5% by weight of water and is otherwise suitable for preparing a microcellular elastomer, then the level of B(v) is preferably in the range of from 1.0 to 14% of Component B by weight, more preferably from 1.5 to 10%, and still more preferably from 3.0 to less than 10% by weight of Component B. Finally, if the Component B contains greater than or equal to 0.5% by weight of water and is otherwise suitable for preparing a flexible or semi-flexible foam, then the level of B(v) is preferably in the range of 0 to 8% by weight of Component B, more preferably 0.05 to 5%, still more preferably from greater than 0.1 up to 4%, and most preferably from 0.15% to less than 3% by weight of Component B. It is generally preferred that the lower the level of water in the Component B, the higher the level of B(v) that should be used (preferably within the broad ranges specified above) in order to achieve optimum viscoelastic performance in the derived polyurethane material.

Additional non limiting examples of B(v) include: ethylene glycol; 1,4-butanediol; 1,3-butanediol; propylene glycol; diethylene glycol; triethylene glycol; dipropylene glycol; tripropylene glycol; glycerol; trimethylolpropane; trimethylolethane; pentaerythritol; low molecular weight alkoxylates of glycerol; low molecular weight alkoxylates of trimethylolpropane; triethanolamine; triisopropanolamine; low molecular weight alkoxylates of ethylenediamine; N-methyl diethanolamine; N-methyl diisopropanolamine; mixtures of these, and the like. Ethylene glycol, 1,4-butanediol, and combinations of these two glycols are particularly preferred, especially in the preparation of microcellular elastomers having free rise densities of greater than 5.5 pounds per cubic foot (pcf), and in the preparation of solid elastomers.

Crosslinking

The reaction systems are most preferably formulated to produce polymers that, whether solid or foamed, are thermoset. The term "thermoset", as used in this context, means that the polymer has at least some crosslinking. Unlike a linear thermoplastic polymer, the polymers produced from the reaction systems disclosed herein are covalently crosslinked network structures which, once cured, do not dissolve or flow without the breaking of covalent bonds. The degree of crosslinking may, of course, vary considerably. Preferred sources of this crosslinking are monomer species having functionalities of greater than 2. The degree of covalent crosslinking is preferred to be light however, and is determined by the functionalities of the monomer species and the Index of the formulation. The flexible and semi-flexible foams and microcellular elastomers disclosed herein are themoset materials by definition of their average molecular weight per crosslink or Mc. Mc for the polymer comprising the foam is calculated by the following equation:

$$Mc = \text{Polymer weight}/(\Sigma(Fn\ \text{real}-2)X\ \text{number of moles reacting})$$

where, Fn real refers to the number average functionality of, or the sum of the reactive equivalents divided by the sum of the moles, for each of the reactive materials in the polymer formulation. As such, the Mc (average molecular weight per crosslink) ranges for the polymer comprising the foam disclosed herein can range from 4000 to 700, more preferably from 3000 to 1000 and most preferably from 2000 to 1000, as calculated from the formula above.

Separation of Polyol Components

Polyol components that comprise blends of EO rich and PO rich polyols will sometimes separate when mixed. Such polyols can be metered separately to a mix head, such as in the slabstock process using a mix head that can accommodate greater than two reactive liquid chemical components, and foams can thereby still be practically prepared. In the case of two component systems consisting of a formulated "B" or polyol blend component and a reactive isocyanate component, separation of EO rich and PO rich polyols in the blend can create problems in maintaining a homogeneous polyol blend. As such, a preferred embodiment is the use of a three component polyol blend, wherein one of the polyols compatibilizes the EO rich and PO rich polyols. In the case of formulating a non-separating polyol component, the use of a material containing both EO and PO, like JEFFOX® WL-590 polyol [a PO capped high EO containing polyol available from Huntsman Petrochemical Corporation], can provide either a non-separating polyol blend or a fully formulated "B" component blend containing, in addition to the polyols, water, catalyst, surfactant and other additives. The compatibilizing polyol, when used, will conform to the structural limitations of one of the four organic polyol types defined herein. Likewise, the final composition of the polyol combination by weight will be within the definitions provided previously for the reaction system. JEFFOX® WL-590 polyol is an example of a specific polyol of type B(ii). It has an EO content of 75% by weight. However, the presence of the minor amount of PO in the cap on this polyol enables this structure to perform the additional role of a compatibilizer for the overall blend of high EO and high PO polyols in a blended isocyanate reactive component. In a particularly preferred embodiment, JEFFOX®WL-590 polyol (or another polyol of similar structure, having high EO and some PO) is used as a portion of B(ii) and most desirably as a minor portion by weight of B(ii).

Surfactant

The reaction system is very strongly preferred to contain a surfactant. The use of a surfactant is, however, optional. The surfactant may help to compatibilize, or at least retard the separation of, the high EO plus high PO (or high oxytetramethylene) polyols in the reaction system. The optional surfactant is, however, beneficial even if the high EO and high PO (or high oxytetramethylene) polyols are processed as separate streams because the surfactant stabilizes against collapse during the formation of foams and microcellular materials. If the reaction system is a foam system designed to produce a foam with a free rise density of 10 pounds per cubic foot (pcf) or lower, then the surfactant is an even more desirable component useful also to stabilize the foam against collapse. The use of a surfactant is highly recommended for all embodiments, whether or not foaming of the polymer is involved, in order to avoid stability problems caused by possible separations of ingredients during the polymerization reaction. The surfactant is also instrumental in opening the cells of the foam, and thereby preventing shrinkage thereof. The preferred surfactants are polysiloxane based surfactants, most preferably those comprising polyether-polysiloxane copolymers. These types of surfactants are well known in the art. The surfactant compositions used may optionally contain small amounts of isocyanate reactive functional groups, such as alcoholic —OH groups. The range of hydroxyl numbers for the surfactant composition is from about 0 to about 100, preferably 0 to less than 50, and most preferably 0 to less than 30. The preferred total loading of surfactant in the reaction system is from 0.1 to 5% by weight of the total reaction system. This loading is more preferably in the range of from about 0.15% to 5% by weight, still more preferably from about 0.20 to 5% by weight, even more preferably form 0.25 to 5% by weight, and most preferably from 0.25 to 2.5% by weight of the total reaction system. A non-limiting example of a particularly preferred commercial polysiloxane-based surfactant composition for use in the invention is TEGOSTAB® B-8871 surfactant, which is available from Degussa-Goldschmidt AG. Another non-limiting example of a preferred polysiloxane based surfactant composition for use in the invention is NIAX® L-603 surfactant, which is commercially available from the OSI Specialties Division of Witco Corporation. It should be understood that some commercial polysiloxane based surfactant products contain non-siloxane carriers such as lower glycols. These lower glycol carriers may be a source of component B(v) in the reaction system. These non-siloxane carriers are not considered as part of the weight of the surfactant in determining the loading of the polysiloxane based surfactant(s) in the reaction system. Mixtures of two or more polysiloxane surfactants may optionally be used if desired, but it is preferred that the combined loading of polysiloxane surfactants in the total reaction system on a weight basis is within the parameters defined herein.

Catalyst

The reaction system additionally comprises at least one catalyst suitable for promoting at least one polymer forming reaction of polyisocyanates. Many such catalysts are known in the art, but catalysts for the urethane and isocyanate-water (urea) reactions are most preferred. The catalyst may be a mixture of two or more different catalytic species. Individual catalytic species may optionally contain one or more isocyanate reactive groups. In a certain embodiment, one or more of the polyol ingredients, discussed previously, may contain all or part of the catalytic species needed to produce the polymer, the catalytic species being structurally incorporated into the polyol molecule(s). Non limiting examples include the use of polyols that contain tertiary amine groups. Such tertiary amine containing polyols are very well known in the art, and may be prepared most typically by alkoxylation of an amine initiator. Aliphatic amine initiators and ammonia (initiator) are preferred in this specific embodiment.

A large number of very commonly used catalysts do not contain any isocyanate reactive functional groups within the molecular structure of the catalytic molecule itself, but may optionally be supplied in an isocyanate reactive carrier such as a low molecular weight glycol. Such glycol carriers in catalysts may be a source of B(v) in the reaction system. If water is present in the system as a blowing agent, then the catalyst or mixture of catalysts used should be capable of promoting both the urethane reaction and the isocyanate-water reaction. It is the latter reaction that is an important source of blowing when water is used, and it also contributes considerable chain extension (hard-block formation) due to the urea formation that accompanies this reaction. In producing a stable foam with the desired physical properties and predominantly open cells, it is necessary to balance the urethane forming and water reactions very carefully. This is usually accomplished through the catalyst package, and is well known in the art. Aliphatic tertiary amines are a particularly preferred class of catalyst compounds. Organometallic catalysts are also widely used, often in combination with the tertiary amines. Non limiting examples of specific catalysts and catalyst combinations that are widely used in the art include the following: triethylene diamine (TEDA); bis-(2-(N,N-dimethylamio)-ethyl) ether; combinations of TEDA and bis-(2-(N,N-dimethylamino)-ethyl) ether; N,N-dimethyl ethanolamine; N-methyl morpholine; N-ethyl morpholine; N-[2-(N,N-dimethylamino)ethyl] morpholine; N,N'-bis-2-(N,N-dimethylamino)ethyl piperazine; bis-(2-morpholino)diethyl ether (DMDEE); N,N-dimethylcyclohexylamine; N,N,N',N",N"-pentamethyl diethylenetriamine; mixtures of N,N-dimethylcyclohexylamine and N,N,N',N",N"-pentamethyl diethylenetriamine; mixtures of N,N-dimethyl ethanolamine, TEDA, and bis-(2-(N,N-dimethylamino)-ethyl) ether; 2-(N-methyl-N-(2-hydroxylethyl) aminoethyl)-2'-(N',N'-dimethylaminoethyl) ether; N,N'-diethyl piperazine; dibutyltin dilaurate; dibutyltin diacetate; aiethyltin dioleate; mixtures of dibutyltin dilaurate, TEDA, and bis-(2-(N,N-dimethylamio)-ethyl) ether; dialkyltin mercaptides; potassium 2-ethyl hexanoate; potassium acetate; mixtures of potassium 2-ethyl hexanoate, TEDA, and bis-(2-(N,N-dimethylamio)-ethyl) ether; N-butyl morpholine; N,N-dimethylamino-1,3-propanediamine; N,N-dimethylamino-1,2-propanediamine; Mixtures of either N,N-dimethylamino-1,3-propanediamine or N,N-dimethylamino-1,2-propanediamine, TEDA, and bis-(2-(N,N-dimethylamio)-ethyl) ether; stannous octoate; mixtures of stannous octoate, TEDA, and bis-(2-(N,N-dimethylamio)-ethyl) ether; amides of either N,N-dimethylamino-1,3-propanediamine or N,N-dimethylamino-1,2-propanedimaine with one or more aliphatic monocarboxylic acids of C-8 to C-24; salts of either N,N-dimethylamino-1,3-propanediamine or N,N-dimethylamino-1,2-propanediamine with one or more aliphatic monocarboxylic acids of C-8 to C-24; beta-(dimethylamino)-N,N-dimethylpropionamide; mixtures of TEDA and beta-(dimethylamino)-N,N-dimethylpropionamide; mixtures of TEDA, beta-(dimethylamino)-N,N-dimethylpropionamide, and bis-(2-(N,N-dimethylamio)-ethyl) ether; salts of TEDA and a monocarboxylic acid; a salt of TEDA and formic acid; mixtures of TEDA, a formic acid salt of TEDA, and bis-(2-(N,N-dimethylamio)-ethyl) ether; bismuth salts of carboxylic acids; iron acetylacetonates; titanium acetylacetonates; titanium alkoxides; combinations of these; and the like.

Except in the special situation wherein one or more of the organic polyols in the reaction system (specifically B(ii), B(iii), B(iv), or B(v)) contains catalytic functionality, the total loading of catalysts (measured as the active catalytic species, neglecting any carriers) in the reaction system is from about 0.001% to about 8% by weight of the total reaction system, preferably from 0.01 to 5%, more preferably from 0.05 to 4%, still more preferably from 0.1 to 3.5%; even more preferably from 0.15 to 3%, and most preferably from 0.2 to 2.5% of the total reaction system.

Additives

The reaction system optionally contains other additives known in the art. These optional additional additives may comprise some species that contain isocyanate reactive groups, but it is more preferred that the total package of such additives be essentially free of species that contain isocyanate reactive groups. The total loading of the optional additive (E) in the reaction system is desirably 30% by weight or less, preferably less than 25%, more preferably less than 20%, still more preferably less than 15%, even more preferably less than 10%, and most preferably less than 5% by weight of the total reaction system. The use of some such additives comprising isocyanate reactive groups is sometimes unavoidable. The combined loading of such isocyanate reactive species, when these must be used, relative to the total reaction system on a weight basis should be less than 10%, preferably less than 5%, more preferably less than 3%, still more preferably less than 2%, even more preferably less than 1.5%, and most preferably less than 1%.

The terms "isocyanate reactive species" or "isocyanate reactive groups" as used herein denote molecular species or functional groups, respectively, that can react with the free isocyanate groups present in the reaction system under the conditions used to process the system into a polymeric article.

Some non limiting examples of some of types of optional additives includes the following: fire retardants such as tris-(chloropropyl)-phosphate, antimony oxide, melamine, brominated aromatic compounds, graphite, combinations of these, and the like; pigments such as carbon black, titanium dioxide, calcium carbonate, zinc oxide, iron oxides, combinations of these, and the like; additional chemical blowing agents such as azodicarbonamide; physical blowing agents such as inert hydrocarbons and halocarbons having boiling points of less than 50° C. at 1 atmosphere pressure, dispersed or dissolved or injected inert gasses such as $CO_2$, $N_2$, air, combinations of these, and the like; internal mold release agents such as fatty esters, fatty polyesters, fatty amides, silicones, metal salts of fatty carboxylic acids, combinations of these, and the like; adhesion promoters such as alkoxysilanes; fillers such as barium sulfate, calcium carbonate, dry wood flour, dry diatomaceous earth, dry silica, combinations of these, and the like; plasticizers such as diisooctyl phthalate, inert aromatic hydrocarbons having boiling points greater than 200° C. at 1 atmosphere pressure, inert aliphatic hydrocarbons having boiling points greater than 200° C. at 1 atmosphere pressure, triglycerides derived from vegetable or animal sources and essentially free of species containing isocyanate reactive groups, mixtures of these, and the like; non volatile solvents such as cyclic alkylene carbonates, Glymes, and cyclic tertiary amides having boiling points at 1 atmosphere pressure of 200° C. or higher; antioxidants such as BHT, BHA, and the like; light stabilizers such as hindered amine light stabilizers (HALS); fragrances such as vanilla extract; reinforcements such as glass fibers, glass flakes, glass mats or veils, natural fibers, synthetic organic fibers, metal fibers; combinations of these; and other additional additives which are known in the art.

Any or all of the organic polyols used in the reaction system may optionally be modified with a dispersed or grafted solid organic polymer which is different from the composition of the polyol(s) and in a different physical phase from the polyol(s). These types of modified polyols are well known in the art as graft polyols (or polymer polyols). The dispersed or grafted polymer phase shall be regarded as an additional optional additive, falling within the definition of an additive under (E) of the reaction system. The dispersed or grafted phase shall be neglected (subtracted from) the polyol composition in determining the specifications of the polyol, such as its functionality, equivalent weight, molecular weight, and alkylene oxide composition by weight. The use of these dispersed or grafted organic polymers is not required for the successful practice of the invention, but may be used if desired. Representative but non-limiting examples of polymer phases which may be used in making polymer polyols include members selected from the group consisting of: styrene acrylonitrile copolymers, insoluble polyurea particles, insoluble polyurethane particles, combinations of these, and the like. It is the composition of the base polyol, as opposed to the polymer polyol which may be made from it, that should be considered in the context of this invention in regard to the definitions of the individual types of polyols used.

Reaction System

It is strongly preferred that the reaction system consist essentially of (A) through (E) described above, and be essentially free of additional reactive (polymer forming) ingredients. However, it is conceivable to include minor amounts of such additional reactive species, which may not be within the definitions of any of (A) through (E). The additional reactive ingredients, if used, must be limited to less than 10% by weight of the total reaction system, preferably less than 5%, more preferably less than 3%, still more preferably less than 2.5%, even more preferably less than 2%, and most preferably less than 1.5% of the total reaction system by weight. The optional additional reactive ingredients may be added to the reaction system directly, or prereacted (where chemically appropriate) with the monomeric polyisocyanate to form isocyanate terminated prepolymer type species, or any combination thereof.

The ratio of all the isocyanate (—NCO) groups in the reaction system to all the isocyanate reactive groups in the reaction system, from all sources combined, must be in the range of from greater than 0.50 up to 1.10, preferably from 0.70 to less than 1.00, more preferably from 0.80 to 0.95, and most preferably from 0.80 to less than 0.95. This is the range of ratios over which the mixing activated reaction system is processed into polymeric articles. This ratio is known in the art as the Isocyanate Index, and is sometimes multiplied by 100 and expressed as a percent.

The reaction system may be processed into polymers by any of a wide range of processing means known in the polyurethane art. These may include hand mixing or machine mixing, batch or continuous processing.

In one preferred embodiment, all the non-prepolymerized isocyanate reactive materials and all or most additives are formulated into a single liquid isocyanate reactive component, and correspondingly all isocyanate group containing species, including any prepolymeric species, are formulated into a single liquid isocyanate component. This two component mode of processing is particularly useful for processing the reaction system by hand mixing, or on equipment designed to handle just two liquid components.

In another preferred embodiment, the reaction system is formulated into one main isocyanate reactive liquid component, which comprises all or most of B(ii)–B(v). A second liquid stream contains the isocyanate functional materials, optionally including a portion of B(iv) in prepolymerized form. One or more additional liquid streams comprise catalysts, surfactants, other additives, and water, either individually or in various combinations. In practicing this embodiment, these additional steams may also comprise minor amounts of one or more of the organic polyols, preferably at least some of B(v) to act as liquid diluent carriers for the various additives. Many variations on this multi-component embodiment will be recognized by those skilled in the art. Some of these may include some portion of the additives (such as surfactant and catalysts) into the main polyol blend. The individual component streams are then metered separately to a mixing head and dispensed into a mold or onto a slab line.

It is within the scope of the invention to break up all, or any desired portion, of the separate ingredients within the reaction system, including, if desired, the different isocyanate species in the isocyanate containing component into separate streams. The number of separate chemical streams that may be used when processing the reaction system of the invention into useful polymeric articles is limited only by the available processing apparatus. Multicomponent processing (which, in the context of this invention, means the use of greater than two separate chemical components during processing) is widely used in producing free rise slabstock foam. Continuous flexible slabstock foam manufacture is a particularly preferred application of the reaction system. Batch processed variants of the slabstock manufacturing process, such as free rise box foaming, may also be used if desired. The reaction system may also, if desired, be used in producing molded foams, molded or cast elastomers, pour-behind foams, continuously poured elastomers, spin cast elastomers, sprayed foams, and sprayed elastomers. The elastomers may, of course, be solid or microcellular. The manufacture of cellular polymeric articles, such as foams and microcellular elastomers, are particularly preferred applications of the reaction systems. Apparatus suitable for use with the various processing modes will be well known to those skilled in the art.

A particularly preferred application is making viscoelastic polyurethaneurea cellular materials. These cellular materials may have overall free rise densities ranging from about 0.5 pounds per cubic foot (pcf) to 100 pcf or higher. A more preferred range of densities extends from about 1 pcf to 10 pcf, still more preferably from 1.5 pcf to 5.5 pcf, even more preferably from 1.8 pcf to 5 pcf, and most preferably from 2 pcf to less than 4 pcf. The foams may optionally have integral skins. The foams are desirably prepared using water as the principal blowing agent, and more preferably as the sole blowing agent. By the term "water as the principle blowing agent", it is meant that water contributes most of the foam expansion. It is within the scope of the invention to use gas injection, such as $CO_2$ or $N_2$ injection, in order to augment the foaming process. It is also possible to use pressurized or liquefied gases, which may be at least partially dissolved or dispersed into one or more of the liquid reactive chemical streams. Likewise, it is possible to use evacuated molds, or other evacuated containers, to enhance foaming by reduction of the atmospheric pressure over the rising foam. Combinations of these various foaming methods may be used.

Viscoelastic foams produced using the reaction systems, by any desired mode of processing, generally give foams with surprisingly good combinations of physical properties. Especially surprising are the very low compression sets achieved, under both dry and humid aged conditions. These low compression set values are all the more surprising in view of the presence of a relatively high EO content in some of the polyols. Viscoelastic foams prepared from the reaction systems are also predominantly open celled. This is highly desirable for avoiding shrinkage. The cells open spontaneously during normal processing, and costly post-processing operations such as crushing to open the cells are generally not required. The viscoelastic foams and elastomers also exhibit good strength, tear resistance, and elongation properties. The preferred foam formulations have excellent processing characteristics, and due not tend to collapse.

Methods for producing such amphiphilic foams were surprisingly found to be greatly facilitated by the judicious choice of the polyol equivalent weights and the optimum compatibilizing surfactant. Open celled viscoelastic amphiphilic foams can be made over a wide range of water levels. Also surprising is the fact that a very wide range of isocyanate compositions and functionalities can be used as the monomeric polyisocyanate composition in the reaction systems, and still produce foams that are predominantly open celled and do not shrink. The preferred foam forming reaction systems are surprisingly robust with regard to foam stability during the rise profile (i.e. resistance to foam collapse). The reaction systems provide for enormous formulating latitude. Novel amphiphilic viscoelastic foams can be prepared from this broad range of reaction systems, the foams offering the following advantages:

Low density viscoelastic foams, with free rise densities under 3 pounds per cubic foot (pcf) are readily achievable.

Foam hardness may range from very soft, to relatively hard and supportive.

Relatively high density viscoelastic flexible or semiflexible foams having free rise densities of greater than or equal to 5 pcf are possible, by using low water levels and adding an organic chain extender such as ethylene glycol as a co-extender.

The amphiphilic viscoelastic foams, by their very nature, have excellent moisture vapor transmission, which makes them particularly suitable for use in mattresses and seat cushions.

Both free rise and molded foams can be prepared.

Surprisingly low compressions sets are possible, especially when the isocyanate Index (i.e. the ratio of —NCO groups to isocyanate reactive groups in the formulation) is in the range of 0.70 to 1.00. These compression set values are typically 5% or less, measured at 90% compression according to ASTM D3574D-95.

Extremely low resilience is possible, with ball rebound values typically under 10% [as measured according to ASTM D3574H-95].

Large Tan Delta values (of greater than 0.8) are possible, making it easy to achieve high loss factors.

Wide latitude in the selection of monomeric polyisocyanate compositions is possible, which contributes to greater ease in fine tuning the foam properties.

It is easy to prepare very soft viscoelastic foams and microcellular elastomers without the use of extremely high plasticizer levels. Indeed, plasticizers need not be used at all. The reduction in the use of plasticizers for making very soft viscoelastic materials is a major advantage over the prior art since problems associated with plasticizer migration, staining, odor, and toxicity concerns are thereby eliminated or greatly reduced.

In another embodiment, the invention pertains to polymeric articles prepared from the reaction systems described herein. Flexible (soft) and semiflexible foams prepared from reaction systems are generally characterized by having a certain combination of physical properties. The flexible and semiflexible foams have free rise densities in the range of from 2 to 5.5 pounds per cubic foot [measured according to ASTM D3574A-95] ball rebound values of less than 25%, more preferably less than 15%, and still more preferably less than 10% [according to ASTM D3574H-95]; dry compressions set values of less than 10% [according to ASTM D3574D-95, measured at 90% compression]; humid aged compression set values of less than 10% [according to ASTM D3574J2-95, measured at 90% compression]; and hardness values in the range of from 5 lbs. at 25% IFD to 50 lbs. at 25% IFD [according to ASTM D3574B-95]. The viscoelastic flexible (soft) and semiflexible foams made from the reaction system are predominantly open celled and do not exhibit significant shrinkage. Accordingly, these foams do not require the use of mechanical cell opening techniques such as crushing.

Microcellular elastomers prepared from reaction systems have free rise densities of from greater than 5.5 pounds per cubic foot up to 15 pounds per cubic foot [according to ASTM D3574A-95]; ball rebound values of less than 25%, more preferably less than 10% [according to ASTM D3574H-95].

Semiflexible foams prepared from the reaction systems are useful for impact and energy absorbing applications. Semiflexible foams are obtained at the upper end of water level range, typically 4% by weight or more of the isocyanate reactive component. More preferably, semiflexible foams are made with 5% by weight of water or more relative to the isocyanate reactive component, still more preferably 6% or greater, even more preferably 7% or greater, and most preferably greater than 7% by weight of the isocyanate reactive component. An interesting property of the semiflexible foams made from the reaction systems disclosed herein is that these foams are thermoformable at elevated temperatures (typically, 70 to 90° C., and preferably about 80° C.). The thermoformability is useful for the production of large shaped semiflexible foam structures, such as, for example, automobile head-liners.

The following examples are illustrative of the present invention, and are not intended to limit the scope of the invention in any way. Those of skill in the art should, in light of the present disclosure, appreciate that many changes can be made in the specific embodiments that are disclosed and still obtain a like or similar result without departing from the scope of the invention.

EXAMPLES

Glossary
1) DALTOCEL® F-526 polyol: Is ethoxylated glycerine having an hydroxyl number of about 127. The product is a nominal triol, commercially available from Huntsman Polyurethanes.
2) JEFFOL® G30-167 polyol: Is propoxylated glycerine having an hydroxyl value of about 167. The product is a nominal triol, commercially available from Huntsman Polyurethanes.
3) JEFFOX® WL-590 polyol: Is a glycerol initiated block copolymer consisting of about 75% by weight ethylene oxide with 15% by weight of propylene oxide as a cap. The polyol is a nominal triol having predominantly secondary aliphatically bound —OH groups, and an hydroxyl number of about 170. This product is made by Huntsman Petrochemical Corporation.
4) TEGOSTAB® B-8871 surfactant: Is believed to comprise a polyether-polysiloxane copolymer composition. This surfactant product is commercially available from Degussa-Goldschmidt AG, and is believed to have an hydroxyl number of about 100.
5) NIAX® L-603 surfactant: Is believed to be a polyether-polysiloxane copolymer containing composition. This surfactant product is commercially available from the OSI Specialties Division of Witco Corporation.
6) JEFFOL® G31-35 polyol: Is a glycerol initiated propylene oxide based block copolymer that contains about 17% by weight of ethylene oxide as a cap. The product is a nominal triol with an hydroxyl number of about 35. It is commercially available from Huntsman Polyurethanes.
7) JEFFCAT® TD-33A catalyst: Is a 33% by weight solution of triethylenediamine (TEDA) in dipropylene glycol (as carrier). It is available commercially from Huntsman Petrochemical Corporation.
8) RUBINATE® 1245 isocyanate: Is a 60/40 w/w mixture of an 80/20 blend of 4,4'-MDI and 2,4'-MDI containing traces of the 2,2'-MDI isomer, with polymeric (crude) MDI. This mixture, which is commercially available from Huntsman Polyurethanes, has an NCO group content of about 32.8% by weight and has a number averaged NCO group functionality of about 2.3. This product is a liquid at 25° C. with a viscosity at 25° C. of less than 45 cps. The polymeric (crude) MDI from which this blend was prepared is the phosgenation product of a crude aniline+formaldehyde condensate. This polymeric MDI ingredient contains about 50% by weight of diisocyanatodiphenylmethane isomers and about 50% of polymethylene polyphenyl polyisocyanate oligomers of functionality 3 or higher. The diisocyanatodiphenylmethane fraction in this polymeric MDI comprises about 96% of the 4,4'-MDI isomer, about 4% of the 2,4'-MDI isomer, and traces of the 2,2'-MDI isomer. The polymeric MDI ingredient used in preparing this mixture has an NCO group content of about 31.5% by weight and a number averaged NCO group functionality of about 2.7.
9) RUBINATE® 7304 isocyanate: Is a specialized flexible foam grade polyisocyanate variant of the MDI series. This product has a free isocyanate group content of about 32.6% by weight and a number average isocyanate group functionality of about 2.2. It is liquid at 25° C. The product is commercially available from Huntsman Polyurethanes.
10) JEFFCAT® ZF-10 catalyst: Is 100% by weight N,N,N'-trimethyl-N'-[2-hydroxy-ethyl] bis-[2-amino] ethyl ether. It is commercially available from Huntsman Petrochemical Corporation.
11) RUBINATE® 7065 isocyanate: Is a specialized flexible foam grade polyisocyanate variant of the MDI Series. This product has a free isocyanate group content of about 32.0% by weight and a number average isocyanate group functionality of about 2.3. It has a low viscosity liquid at 25° C. The product is commercially available from Huntsman Polyurethanes.
12) RUBINATE® 1820 isocyanate: Is an all purpose mid functionality MDI series polyisocyanate blend useful in various applications. The product has a free isocyanate group content of about 32.0% by weight and a number average isocyanate group functionality of about 2.5. It is a low viscosity liquid at 25° C. The product is commercially available from Huntsman Polyurethanes.
13) PEG 600 polyol: Is a polyoxyethylene glycol of 600 molecular weight and a nominal functionality of 2. It is commercially available from Union Carbide Corporation.
14) PPG® 745 polyol: Is a polyoxypropylene glycol of 725 molecular weight and a nominal functionality of 2. It is commercially available from Bayer Corporation.
15) PTMEG® 1000 polyol: Is a polytetramethylene ether glycol of 1000 molecular weight, available from DuPont Corporation.
16) PERSTORP®TP-200 polyol: Is an ethoxylated trimethylolpropane of 1000 molecular weight and an hydroxyl value of 165. The polyol is available from Perstorp Polyols, Inc.

The Polyol Separation Study

The separation study shown in Tables 7–8 was conducted by weighing 200 grams of the polyols into an 8 ounce glass jar and then vigorously shaking the jar and its content for about 1 minute. The jars were allowed to sit overnight and checked the next day for separation. Those that separated gave distinct layers, while those that did not where soluble clear solutions.

Procedures for Carrying Out the Foam Examples

The polyurethaneurea flexible foam and elastomer examples in Tables 1–5 and Table 9 were prepared by handmixing of the ingredients set forth at ambient temperature. The polyols, water, surfactant and other optional amine catalysts were weighted into a 0.5 liter container and were pre-blended for 3–4 seconds at 2000 rpm. The correct amount of isocyanate was then rapidly poured while weighing into the same mix container and then was immediately mixed for 8–10 seconds at 2000 rpm. This mixed material was rapidly transferred into a 8 liter polyethylene payliner (container). The foaming reaction proceeded and the foam was allowed to free rise. The foams and elastomers were cured a minimum of 24 hours at room temperature before being cut and tested according to ASTM D3574-95. The scale of each preparation was about 335 g (total reaction system weight).

The polyurethaneurea flexible foam examples in Table 6 were prepared on a small scale multi-component Martin Sweets low pressure dispense machine. A total formulation output of about 30 pounds/minute is metered to a 300 cc free volume pin mixer operating at 4000 rpm to provide a homogenous high quality mix. Box foams of 20 inch by 20 inch by 15–20 inch were poured at 25° C. and allowed to free rise. The box foams were cured a minimum of 24 hours at room temperature and then foam samples were cut for physical testing according to ASTM D3574-95.

The 95% Finger Recovery Test Method

A 2 inch by 2 inch by 1 inch thick piece of foam is compressed by one finger to about a 5 mm thickness. The finger is then removed while simultaneously starting a stop watch to record the time (measure in seconds) that the sample recovers at least 95% of its original uncompressed height.

Dynamic Mechanical Analysis (DMA) Equipment and Procedure

TA Instruments —A Subsidiary of Waters Corporation (Model number DMA 2980)

DMA Conditions:
Multifrequency Mode
Tensile Mode
Dual Cantilever Clamp
Temperature range of −140° C. to 150° C.
Ramp Rate: 2° C./min
Frequency: 1 Hz The examples of Table 1 illustrate the working range of polyol components ii and iii when they are both triols. Examples 1C–1F and 1H are according to the invention. Examples 1A, 1B, 1J and 1K are not within the working range claimed, and produced unacceptable foams due to either collapse or severe shrinkage. Estimation of 25% IFD's from the CFD data demonstrate that very soft foams in the range of 5 lbs. to 9 lbs. @25% IFD over densities of about 2.5 pcf to 3.0 pcf are possible using MDI. All these foams exhibit ball rebounds of <10 and 95% Finger Recoveries of 8 to 30 secs.

The handmix examples of Table 2 shows that EO rich polyols can consist of a blend of an all EO version DALTOCEL® F526 polyol and a PO capped high EO version JEFFOX® WL-590 polyol and that perfectly acceptable viscoelastic foams of varying 95% Finger Recovery times are possible. These foams are all according to the invention.

The handmix examples of Table 3 cover various diol and triol combinations of the EO rich and PO rich polyols of the invention. All of the examples of Table 3 are within the scope of the invention. The combination of an all PO diol with an all EO triol shown in examples 5A-5C gave foams that were very open and self reticulated as shown by the high airflows. The combination of an all EO diol with an all PO triol as shown in examples 5D-5F made good quality viscoelastic foams, but at much reduced airflow to the former combination. Even combinations of an all EO diol and an all PO diol makes acceptable viscoelastic foams and allow the use of higher functional isocyanates like the RUBINATE® 7065 isocyanate and RUBINATE® 1820 isocyanate (examples 3H & 3I)

The handmix examples of Table 4 illustrate the use of B(v), a low equivalent weight chain extender to modify the hardness and viscoelastic properties via a microcellular formulation approach. All of the examples of Table 4 are within the scope of the invention. Where low water levels lead to more resilient foams at room temperature due to a Tg well below RT, the addition of a chain extender will shift the Tg back up to RT. Examples 3D-3F illustrate microcellular type flexible foams at water levels of 0.5 pbw and ethylene glycol levels of 5 pbw to 10 pbw. These higher density foams at high EG levels (examples 4H & 4I) lead to very hard and energy absorbing foams.

The handmix examples of Table 5 show that higher water levels lead to the production of lower density semi-flexible foams with both energy absorbing and thermoformable qualities. To illustrate the thermoformability sample 5C was placed in an oven at 80° C. for 2 hours with a 0.25 pound metal weight on the foam. Sample 5C with the weight in place was removed and allowed to cool to RT. On removing the weight, an exact impression of the metal shape was left in the foam and there was no recovery of the compressed foam. All of the examples of Table 5 are within the scope of the invention. Such foams would be suitable for packaging applications. It also shows that isocyanate or NCO indexes down to 50 produce good quality foams.

Table 6 is a machine run of free rise slabstock type viscoelastic foams at NCO indexes of 70 and 80 with the measurement of a very complete set of physical properties. These examples, which are within the scope of the invention, exhibit the use of B(iv). These foams exhibit particularly good compression sets, when tested at 90% compression.

The examples of Table 9 show examples of other polyols that produced acceptable open celled and low resilience viscoelastic type foam. Examples 9.1, 9.2, 9.3 and 9.4 cover the use of a hydrophilic B(ii) based on PERSTORP® TP-200 polyol, an ethoxylated trimethylolpropane of nominal 1000 MW in combination with other polyols of the subject invention. Examples 9.5 and 9.6 cover the use of the polytetramethylene ether glycol PTMEG® 1000 as the base hydrophobic B(iii). Example 9.5 uses no water or blowing agent and so is a high density viscous gel-like material.

Some of the Examples shown in the Tables contain tan delta values measured on the polymer samples, as evidence of phase mixing and of a glass transition temperature in the 0 to 50° C. range for the polymeric materials according to the subject invention.

Terms Used in the Examples a) Support Factor: via CFD Measurement: It is the ratio 65% deflection value divided by the 25% deflection value and gives an indication of a foam's ability to support increasing loads as the foam is compressed without bottoming out.

b) Percent Recovery: via CFD Measurement: It is the 25% deflection return value divided by the initial 25% deflection value times 100. The higher the % recovery the less hysteresis loss of the polymer.

TABLE 1

Visco Examples
PO Rich & EO Rich Triol Blends
Handmixed

| Components: parts by weight | 1A PBW | 1B PBW | 1C PBW | 1D PBW | 1E PBW | 1F PBW | 1G PBW | 1H PBW | 1J PBW | 1K PBW | Test Method ASTM |
|---|---|---|---|---|---|---|---|---|---|---|---|
| JEFFOX ® G30-167 polyol | 100.00 | 80.00 | 70.00 | 60.00 | 50.00 | 40.00 | 30.00 | 30.00 | 20.00 | 0.00 | |
| DALTOCEL ® F526 polyol | 0.00 | 20.00 | 30.00 | 40.00 | 50.00 | 60.00 | 70.00 | 70.00 | 80.00 | 100.00 | |
| JEFFCAT ® TD-33A catalyst | 0.40 | 0.40 | 0.40 | 0.40 | 0.40 | 0.40 | 0.40 | 0.40 | 0.40 | 0.40 | |
| TEGOSTAB ® B8871 surfactant | 0.50 | 0.50 | 0.50 | 0.50 | 0.50 | 0.50 | 0.50 | 1.00 | 0.50 | 0.50 | |
| Water | 3.00 | 3.00 | 3.00 | 3.00 | 3.00 | 3.00 | 3.00 | 3.00 | 3.00 | 3.00 | |
| NCO Index | 80 | 80 | 80 | 80 | 80 | 80 | 80 | 80 | 80 | 80 | |
| RUBINATE ® 1245 isocyanate | 65.3 | 63.8 | 63.1 | 62.3 | 61.6 | 60.9 | 60.1 | 60.1 | 59.4 | 58.0 | |
| Mc - Molecular weight per crosslink | 1274 | 1321 | 1347 | 1374 | 1402 | 1432 | 1463 | 1463 | 1496 | 1567 | |
| Density, lbs/ft3 | NA | NA | 2.46 | 2.63 | 2.79 | 2.83 | NA | 2.64 | NA | NA | |
| Foam Quality: | | | | | | | | | | | |
| Open - Good | | | X | X | X | X | | X | | | |
| Tight - Shrink | | X | | | | | X | | X | X | |
| Recession - Collapse | X | | | | | | | | | | |
| CFD: lbs/4 in$^2$ | | | | | | | | | | | D3574C |
| 25% | | | 0.67 | 0.54 | 0.43 | 0.54 | | 0.37 | | | |
| 65% | | | 1.61 | 1.25 | 0.91 | 1.07 | | 0.8 | | | |
| Support Factor | | | 2.4 | 2.31 | 2.12 | 1.98 | | 2.16 | | | |
| % Recovery | | | 61.2 | 66.7 | 83.7 | 88.9 | | 75.7 | | | |
| Est. 25% IFD, lbs* | 0.0 | 0.0 | 8.4 | 6.8 | 5.4 | 6.8 | 0.0 | 4.6 | 0.0 | 0.0 | |
| Resilience-% ball rebound | NA | NA | 10 | 8 | 0 | 0 | NA | 0 | NA | NA | D3574H-95 |
| 95% Finger Recovery, secs | | | 30 | 30 | 20 | 8 | | 13 | | | |
| Airflow, scfm | | | 0.67 | 2.2 | 2.9 | 0.84 | | 0.3 | | | D3574G-95 |
| DMA's: | | | | | | | | | | | |
| Tan Delta Peak-1, ° C. | | | 12.4 | 15.7 | 11.4 | 4.4 | | 1.1 | | | |
| Tan Delta Peak-2, ° C. | | | | | | 28 shoulder | | | | | |

*25% IFD ~=25% CFD × 12.5

Table 2

Visco Examples
Various Blends with WL-590
Handmixed

| Components: parts by weight | 2A PBW | 2B PBW | 2C PBW | 2D PBW | 2E PBW | 2F PBW | 2G PBW | Test Method ASTM |
|---|---|---|---|---|---|---|---|---|
| JEFFOL ® G30-167 polyol | 45.00 | 40.00 | 35.00 | 30.00 | 27.00 | 40.00 | 53.00 | |
| DALTOCEL ® F526 polyol | 45.00 | 40.00 | 35.00 | 30.00 | 53.00 | 40.00 | 27.00 | |
| JEFFOX ® WL-590 polyol | 10.00 | 20.00 | 30.00 | 40.00 | 20.00 | 20.00 | 20.00 | |
| JEFFCAT ® TD-33A catalyst | 0.40 | 0.40 | 0.40 | 0.40 | 0.40 | 0.40 | 0.40 | |
| TEGOSTAB ® B8871 surfactant | 1.00 | 1.00 | 1.00 | 1.00 | 1.00 | 1.00 | 1.00 | |
| Water | 3.00 | 3.00 | 3.00 | 3.00 | 3.00 | 3.00 | 3.00 | |
| NCO Index | 80 | 80 | 80 | 80 | 80 | 80 | 80 | |
| RUBINATE ® 1245 isocyanate | 62.1 | 62.5 | 63.0 | 63.4 | 61.6 | 62.5 | 63.5 | |
| Density, lbs/ft3 | 2.67 | 2.66 | 2.68 | 2.69 | 2.69 | 2.56 | 2.50 | D3574A-95 |
| Mc - Molecular weight per crosslink | 1396 | 1386 | 1376 | 1366 | 1423 | 1386 | 1351 | |
| CFD: lbs/4 in$^2$ | | | | | | | | D3574C-95 |
| 25% | 0.45 | 0.44 | 0.53 | 0.53 | 0.56 | 0.53 | 0.51 | |
| 65% | 0.93 | 0.94 | 1.16 | 1.09 | 1.22 | 1.17 | 0.99 | |
| Support Factor | 2.07 | 2.14 | 2.19 | 2.06 | 2.18 | 2.21 | 1.94 | |
| % Recovery | 80 | 81.8 | 84.9 | 88.6 | 82.1 | 77.4 | 92.2 | |
| Est. 25% IFD, lbs* | 5.6 | 5.5 | 6.6 | 6.6 | 7.0 | 6.6 | 6.4 | |
| Resilience-% ball rebound | 0 | 0 | 0 | 0 | 0 | 0 | 0 | D3574H-95 |
| 95% Finger Recovery, secs | 30 | 30 | 20 | 6 | 10 | 45 | 25 | |

Table 3

Visco Examples
Diol/Triol blends
Handmixed

| Components: | 3A PBW | 3B PBW | 3C PBW | 3D PBW | 3E PBW | 3F PBW | 3G PBW | 3H PBW | 3I PBW | Test Method ASTM |
|---|---|---|---|---|---|---|---|---|---|---|
| JEFFOL ® 30-167 polyol | | | | 40.00 | 50.00 | 60.00 | | | | |
| DALTOCEL ® F526 polyol | 40.00 | 50.00 | 60.00 | | | | | | | |
| PEG 600 polyol | | | | 60.00 | 50.00 | 40.00 | 50.00 | 50.00 | 50.00 | |
| PPG ® 725 polyol | 60.00 | 50.00 | 40.00 | | | | 50.00 | 50.00 | 50.00 | |
| JEFFCAT ® TD-33A catalyst | 0.40 | 0.40 | 0.40 | 0.40 | 0.40 | 0.40 | 0.40 | 0.40 | 0.40 | |
| TEGOSTAB ® B8871 surfactant | 0.50 | 0.50 | 0.50 | 0.50 | 0.50 | 0.50 | 0.50 | 0.50 | 0.50 | |
| Water | 3.00 | 3.00 | 3.00 | 3.00 | 3.00 | 3.00 | 3.00 | 3.00 | 3.00 | |
| NCO Index | 80 | 80 | 80 | 80 | 80 | 80 | 80 | 80 | 80 | |
| RUBINATE ® 1245 isocyanate | 69.5 | 67.6 | 65.6 | 57.2 | 58.5 | 59.9 | 64.5 | | | |
| RUBINATE ® 7065 isocyanate | | | | | | | | 65.9 | | |
| RUBINATE ® 1820 isocyanate | | | | | | | | | 65.9 | |
| Density, lbs/ft3 | 2.48 | 2.57 | 3.05 | 2.77 | 2.63 | 2.71 | 2.53 | 2.60 | 2.61 | D3574A-95 |
| Mc - Malecular weight per crosslink | 2258 | 2112 | 1981 | 2087 | 1878 | 1710 | 3392 | 2423 | 1709 | |
| CFD: lbs/4 in$^2$ | | | | | | | | | | D3574C-95 |
| 25% | 0.2 | 0.23 | 0.6 | 0.49 | 0.4 | 0.49 | 0.19 | 0.45 | 0.54 | |
| 65% | 0.57 | 0.58 | 1.1 | 1.01 | 0.82 | 0.94 | 0.41 | 0.98 | 1.23 | |
| Support Factor | 2.85 | 2.52 | 1.83 | 2.06 | 2.05 | 1.92 | 2.16 | 2.18 | 2.28 | |
| % Recovery | 50 | 87 | 85 | 87.8 | 85 | 75.5 | 78.9 | 80.0 | 75.9 | |
| Est. 25% IFD, lbs* | 2.5 | 2.9 | 7.5 | 6.1 | 5 | 6.1 | 2.4 | 5.6 | 6.8 | |
| Resilience-% ball rebound | 11 | 0 | 0 | 0 | 0 | 0 | 2 | 3 | 6 | D3574H-95 |
| 95% Finger Recovery, secs | >60 | 20 | 5 | 10 | 15 | 25 | 13 | 35 | >60 | |
| Airflow, scfm | 7.9 | 8.3 | 3.2 | 0.88 | 1.43 | 0.18 | 5.8 | 4.7 | 4.5 | D3574G-95 |

TABLE 4

Microcellular Visco Examples
Low Water - EG Extended
Handmixed

| Components: parts by weight | 4B PBW | 4C PBW | 4E PBW | 4G PBW | 4H PBW | 4I PBW | Test Method ASTM |
|---|---|---|---|---|---|---|---|
| JEFFOL ® G30-167 polyol | 40.00 | 40.00 | 40.00 | 40.00 | 40.00 | 40.00 | |
| DALTOCEL ® F526 polyol | 40.00 | 40.00 | 40.00 | 40.00 | 40.00 | 40.00 | |
| JEFFOX ® WL-590 polyol | 20.00 | 20.00 | 20.00 | 20.00 | 20.00 | 20.00 | |
| Ethylene Glycol | 1.50 | 3.00 | 5.00 | 5.00 | 8.50 | 10.00 | |
| JEFFCAT ® TD-33A catalyst | 0.40 | 0.20 | 0.20 | 0.40 | 0.40 | 0.40 | |
| TEGOSTAB ® B8871 surfactant | 1.00 | 1.00 | 1.00 | 1.00 | 1.00 | 1.00 | |
| Water | 1.50 | 1.50 | 1.50 | 0.50 | 0.50 | 0.50 | |
| NCO Index | 100 | 90 | 80 | 100 | 80 | 100 | |
| RUBINATE ® 1245 isocyanate | 62.7 | 62.0 | 61.8 | 63.2 | 62.2 | 83.9 | |
| Mc - Molecular weight per crosslink | 1225 | 1324 | 1443 | 1263 | 1485 | 1306 | |
| Density, lbs/ft$^3$ | 4.08 | 4.89 | 5.13 | 8.6 | 10.3 | 7.5 | D3574A-95 |
| CFD: lbs/4 in$^2$ | | | | | | | D3574C-95 |
| 25% | 1.91 | 1.66 | 1.11 | | 1.47 | | |
| 65% | 4.06 | 3.46 | 2.45 | | 5.87 | | |
| Support Factor | 2.13 | 2.08 | 2.21 | | 4.0 | | |
| % Recovery | 92.1 | 93.4 | 91 | | 83.7 | | |
| Resilience-% ball rebound | 0 | 0 | 0 | | 3 | | D3574H-95 |
| 95% Finger Recovery, secs | 4 | 10 | 10 | | 8 | | |
| DMA's: | | | | | | | |
| Tan Delta Peak-1, ° C. | 9.5 | | 6.1 | 12.4 | 18.3 strong | | |
| Tan Delta Peak-2, ° C. | 20.2 | | 34.8 | 36.3 | 32.9 weak | | |

TABLE 5

Water Blown Foams flexible through semi-flexible Handmixed

| Components: | 5A PBW | 5B PBW | 5C PBW | 5D PBW | 5E PBW | 5F PBW |
|---|---|---|---|---|---|---|
| JEFFOL ® G30-167 polyol | 40.00 | 40.00 | 40.00 | 30.00 | 40.00 | 40.00 |
| DALTOCEL ® F526 polyol | 40.00 | 40.00 | 40.00 | 30.00 | 40.00 | 40.00 |
| JEFFOX ® WL-590 polyol | 20.00 | 20.00 | 20.00 | 40.00 | 20.00 | 20.00 |
| JEFFCAT ® TD-33A catalyst | 0.60 | 0.60 | 0.60 | 0.60 | 0.60 | 0.50 |
| TEGOSTAB ® B8871 surfactant | 2.00 | 2.00 | 2.00 | 2.00 | 2.00 | 2.00 |
| Water | 4.00 | 5.00 | 6.00 | 6.00 | 7.00 | 10.00 |
| NCO Index | 80 | 80 | 80 | 80 | 50 | 50 |
| RUBINATE ® 1245 isocyanate | 74.2 | 85.6 | 97 | 97.9 | 67.5 | 89.1 |
| Density - lbs/ft3 | 2.5 | 1.92 | 1.47 | 1.49 | 1.9 | 1.16 |
| Mc - Molecular weight per crosslink | 1383 | 1373 | 1363 | 1347 | 1766 | 1686 |
| Type Foam | flexible | semi-flex | semi-flex | semi-flex | soft-flex | Soft-semi-flex |

TABLE 6

Visco Examples Machine Produced

| Components: | 6A PBW | 6B PBW | ASTM Method |
|---|---|---|---|
| JEFFOL ® G30-167 polyol | 40.00 | 40.00 | |
| DALTOCEL ® F526 polyol | 40.00 | 40.00 | |
| JEFFOX ® WL-590 polyol | 20.00 | 20.00 | |
| JEFFOL ® G31-35 polyol | 1.25 | 5.00 | |
| JEFFCAT ® ZF-10 catalyst | 0.15 | 0.15 | |
| JEFFCAT ® TD-33A catalyst | 0.40 | 0.40 | |
| NIAX ® L-603 surfactant | 0.30 | 0.30 | |
| Water | 3.00 | 3.00 | |
| Index | 70 | 80 | |
| RUBINATE ® 7304 isocyanate | 54.8 | 62.9 | |
| Mc | 1516 | 1418 | |
| Density, lbs/ft3 | 3.2 | 3.2 | D3574A-95 |
| 25% IFD, lbs | 19.2 | 28.3 | D3574B$_1$-95 |
| Tensile Strength, psi | 5.4 | 8.7 | D3574E-95 |
| % Elongation @ break | 121 | 118 | D3574E-95 |
| Tear Strength, psi | 1.0 | 1.0 | D3574F-95 |
| 75% Humid Age Comp.Set, %* | 3.3 | 6.4 | D3574J2-95 |
| 90% Compression Set, %* | 2.5 | 1.6 | D3574D-95 |
| Resilience Test - % ball rebound | 6 | 5 | D3574H-95 |
| DMA - Tan Delta Range | −50 to +50° C. | NA | |
| DMA - Tan Delta Peak | 12 C. | NA | |

*Set versus thickness

TABLE 7

Polyol Blend Separation Study

| | Weight %: | | | | | |
|---|---|---|---|---|---|---|
| DALTOCEL ® F-526 polyol | 50 | 45 | 40 | 35 | 30 | 25 |
| JEFFOL ® G30-167 polyol | 50 | 45 | 40 | 35 | 30 | 25 |
| JEFFOX ® WL-590 polyol | 0 | 10 | 20 | 30 | 40 | 50 |
| Separation: | yes | yes | no | no | no | no |

TABLE 8

Polyol Blend + Water Separation Study

| | Weight %: | | | |
|---|---|---|---|---|
| DALTOCEL ® F-526 polyol | 45 | 40 | 35 | 30 |
| JEFFOL ® G30-167 polyol | 45 | 40 | 35 | 30 |
| JEFFOX ® WL-590 polyol | 10 | 20 | 30 | 40 |
| Water | 3 | 3 | 3 | 3 |
| Separation: | yes | yes | yes | no |

Table 9

Viscoelastic Patent Examples of other B-ii and B-iii polyol structures

| Components, parts by weight: | Polyol type | 9-1 PBW | 9-2 PBW | 9-3 PBW | 9-4 PBW | 9-5 PBW | 9-6 PBW |
|---|---|---|---|---|---|---|---|
| JEFFOL ® G30-167 polyol | B-ii | 40 | 50 | | | | |
| DALTOCEL ® F526 polyol | B-iii | | | | | | 40 |
| JEFFOX ® WL-590 polyol | B-iii | 20 | | | 20 | 20 | 20 |
| PEG 600 | B-iii | | | | | 40 | |

Table 9-continued

Viscoelastic Patent Examples of other B-ii and B-iii polyol structures

| Components, parts by weight: | Polyol type | Example: 9-1 PBW | 9-2 PBW | 9-3 PBW | 9-4 PBW | 9-5 PBW | 9-6 PBW |
|---|---|---|---|---|---|---|---|
| PTMEG ® 1000 | B-ii | | | | | 40 | 40 |
| PPG 725 | B-ii | | | 50 | 40 | | |
| PERSTORP ® TP-200 | B-iii | 40 | 50 | 50 | 40 | | |
| JEFFCAT ® TD-33A catalyst | | 0.4 | 0.2 | 0.4 | 0.4 | 0.4 | 0.4 |
| TEGOSTAB ® B8871 surfactant | | 1.5 | 1.5 | 1.5 | 1.5 | 0 | 1.5 |
| Water | | 3 | 3 | 3 | 3 | 0 | 3 |
| Index | | 80 | 80 | 80 | 80 | 80 | 80 |
| RUBINATE ® 1245 isocyanate | | 65.53 | 65.37 | 64.25 | 64.64 | 28.64 | 58.5 |
| Mc | | 1330 | 1323 | 1951 | 1794 | 3730 | 2031 |

What is claimed is:

1. A reaction system for the preparation of a viscoelastic thermoset polyurethane material comprising:
   (a) an organic monomeric polyisocyanate composition having a number averaged functionality of organically bound isocyanate groups of from 2 to 3 and a total concentration of organically bound isocyanate groups of from 25 to 50% by weight;
   (b) an isocyanate reactive component comprising:
      (i) from 0 to 12% by weight of the isocyanate reactive component of water;
      (ii) from 30 to 70% by weight of the isocyanate reactive component of a polyoxyethylene based polyol having a combined nominal functionality of primary and secondary aliphatically bound hydroxyl groups of 2 to 4, a number averaged molecular weight of from 400 to 1500, and a number averaged equivalent weight of the combined primary and secondary aliphatically bound hydroxyl groups of from 200 to 750, wherein the polyoxyethylene based polyol is composed of greater than 70% by weight of oxyethylene units and at least 50 mole percent of the aliphatically bound hydroxyl groups are primary hydroxyl groups;
      (iii) from 30 to 70% by weight of the isocyanate reactive component of a second polyoxyalkylene based polyol having a combined nominal functionality of primary and secondary aliphatically bound hydroxyl groups of 2 to 4, a number averaged molecular weight of from 400 to 1500, and a number averaged equivalent weight of the combined primary and secondary aliphatically bound hydroxyl groups of from 200 to 750, wherein the second polyoxyalkylene based polyol is composed of greater than 70% by weight of oxyalkylene units selected from the group consisting of oxypropylene units, oxytetramethylene units, and combinations of oxypropylene and oxytetramethylene units;
      (iv) from 0 to 20% by weight of the isocyanate reactive component of a polyoxypropylene or polyoxyethylene-polyoxypropylene polyol different from (b)(ii) and (b)(iii), having a combined nominal functionality of primary and secondary aliphatically bound hydroxyl groups of 2 to 4, and a number averaged equivalent weight of the combined primary and secondary aliphatically bound hydroxyl groups of from greater than 750 to 4000, wherein the polyoxypropylene or polyoxyethylene-polyoxypropylene polyol contains a weight ratio of oxyethylene to oxypropylene units of from 0:100 to 90:10;
      (v) from 0 to 15% by weight of the isocyanate reactive component of an organic polyol having a combined isocyanate reactive group functionality of 2 to 4 and an equivalent weight of isocyanate reactive groups of from 30 to less than 200, wherein the isocyanate reactive groups are limited to one or more members selected from the group consisting of primary aliphatic alcohol groups, secondary aliphatic alcohol groups, and aliphatic secondary amine groups and at least two of the isocyanate reactive groups are alcohol groups; wherein the weight ratio of (b)(ii) to (b)(iii) is from 70:30 to 30:70, and the combined weight of (b)(ii) and (b)(iii) constitutes at least 53% by weight of the isocyanate reactive component;
   (c) an optional surfactant;
   (d) a catalyst; and
   (e) an optional additive selected from the group consisting of dyes, pigments, internal mold release agents, physical blowing agents, chemical blowing agents, fire retardants, fillers, reinforcements, plasticizers, smoke suppressants, fragrances, antistatic agents, biocides, antioxidants, light stabilizers, adhesion promoters, and combinations of these;
wherein the ratio of organically bound isocyanate groups to the total of isocyanate reactive groups in the reaction system varies from greater than 0.50 to 1.10.

2. The reaction system of claim 1, wherein the ratio of organically bound isocyanate groups to the total of isocyanate reactive groups is from greater than 0.70 to less than 1.00.

3. The reaction system of claim 1, wherein the total weight of the optional additive is less than 30% of the total weight of the reaction system.

4. The reaction system of claim 3, wherein the reaction system is essentially free of blowing agents other than water.

5. The reaction system of claim 3, wherein at least one of (b)(ii) and (b)(iii) has a nominal functionality of isocyanate reactive groups of greater than 2.

6. The reaction system of claim 3, wherein at least one of (b)(ii) and (b)(iii) is a nominal triol.

7. The reaction system of claim 3, wherein both (b)(ii) and (b)(iii) are nominal triols.

8. The reaction system of claim 3, wherein the organic monomeric polyisocyanate composition has a number averaged functionality of isocyanate groups of greater than 2.

9. The reaction system of claim 3, wherein the organic monomeric polyisocyanate composition has a number averaged functionality of isocyanate groups of greater than 2.1 and consists predominantly, on a weight basis, of one or more polyisocyanates of the MDI series.

10. The reaction system of claim 3, wherein the oxyalkylene units in the structure of (b)(iii) consist essentially of oxypropylene units.

11. The reaction system of claim 3, wherein the number averaged hydroxyl equivalent weight of each of (b)(ii) and (b)(iii) varies from 350 to 500.

12. The reaction system of claim 3, wherein the reaction system contains 0.1 to 5% by weight of a polysiloxane-polyether surfactant, relative to the total weight of the reaction system.

13. A viscoelastic polyurethane material prepared from the reaction system of claim 1.

14. The viscoelastic polyurethane material of claim 13, wherein the foaming agent consists of water optionally in combination with one or more dissolved or dispersed atmospheric gases.

15. A reaction system for the preparation of cellular viscoelastic polyurethane thermoset materials comprising:
 (a) an organic monomeric polyisocyanate composition having a number averaged functionality of organically bound isocyanate groups of from 2 to 3 and a total concentration of organically bound isocyanate groups of from 28 to 35% by weight;
 (b) an isocyanate reactive component comprising:
  (i) from 0.15 to 10% by weight of the total isocyanate reactive component of water;
  (ii) from 30 to 70% by weight of the total isocyanate reactive component of a polyoxyethylene based polyol having a combined nominal functionality of primary and secondary aliphatically bound hydroxyl groups of 2 to 3, a number averaged molecular weight of from 400 to 1500, and a number averaged equivalent weight of the combined primary and secondary aliphatically bound hydroxyl groups of from 300 to 550, wherein the polyoxyethylene based polyol is composed of greater than 75% by weight of oxyethylene units and at least 75 mole percent of the aliphatically bound hydroxyl groups are primary hydroxyl groups;
  (iii) from 30 to 70% by weight of the total isocyanate reactive component of a second polyoxyalkylene based polyol having a combined nominal functionality of primary and secondary aliphatically bound hydroxyl groups of 2 to 3, a number averaged molecular weight of from 400 to 1500, and a number averaged equivalent weight of the combined primary and secondary aliphatically bound hydroxyl groups of from 300 to 550, wherein the second polyoxyalkylene based polyol is composed of greater than 90% by weight of oxyalkylene units selected from the group consisting of oxypropylene units, oxytetramethylene units, and combinations of oxypropylene and oxytetramethylene units;
  (iv) from 0 to 20% by weight of the isocyanate reactive component of a polyoxypropylene or polyoxyethylene-polyoxypropylene polyol different from (b)(ii) and (b)(iii), having a combined nominal functionality of primary and secondary aliphatically bound hydroxyl groups of 2 to 4, and a number averaged equivalent weight of the combined primary and secondary aliphatically bound hydroxyl groups of from greater than 750 to 4000, wherein the polyoxypropylene or polyoxyethylene-polyoxypropylene polyol contains a weight ratio of oxyethylene to oxypropylene units of from 10:90 to 30:70;
  (v) from 0.15 to less than 10% by weight of the isocyanate reactive component of an organic polyol having a combined isocyanate reactive group functionality of 2 to 3 and an equivalent weight of isocyanate reactive groups of from 30 to less than 95, wherein the isocyanate reactive groups are limited to one or more members selected from the group consisting of primary aliphatic alcohol groups, secondary aliphatic alcohol groups, and aliphatic secondary amine groups and at least two of the isocyanate reactive groups are alcohol groups; wherein the weight ratio of (b)(ii) to (b)(iii) is from 60:40 to 40:60, and the combined weight of (b)(ii) and (b)(iii) constitutes at least 85% by weight of the isocyanate reactive component;
 (c) a surfactant;
 (d) a catalyst; and
 (e) an optional additive selected from the group consisting of dyes, pigments, internal mold release agents, physical blowing agents, chemical blowing agents, fire retardants, fillers, reinforcements, plasticizers, smoke suppressants, fragrances, antistatic agents, biocides, antioxidants, light stabilizers, adhesion promoters, and combinations of these;
wherein the ratio of organically bound isocyanate groups to the total of isocyanate reactive groups in the reaction system varies from greater than 0.8 to less than 0.95.

16. The reaction system of claim 15, wherein the total weight of the optional additive is less than 20% of the total weight of the reaction system.

17. The reaction system of claim 16, wherein the reaction system is essentially free of blowing agents other than water.

18. The reaction system of claim 16, wherein at least one of (b)(ii) and (b)(iii) has a nominal functionality of isocyanate reactive groups of greater than 2.

19. The reaction system of claim 16, wherein at least one of (b)(ii) and (b)(iii) is a nominal triol.

20. The reaction system of claim 16, wherein both (b)(ii) and (b)(iii) are nominal triols.

21. The reaction system of claim 16, wherein the organic monomeric polyisocyanate composition has a number averaged functionality of isocyanate groups of greater than 2.1 and consists predominantly, on a weight basis, of one or more polyisocyanates of the MDI series.

22. The reaction system of claim 16, wherein the oxyalkylene units in the structure of (b)(iii) consist essentially of oxypropylene units.

23. The reaction system of claim 16, wherein the number averaged hydroxyl equivalent weight of (b)(ii) is in the range of from 350 to 500 and the number averaged hydroxyl equivalent weight of (b)(iii) is in the range of from 350 to 500.

24. The reaction system of claim 16, wherein the reaction system contains 0.25 to 2.5% by weight of a polysiloxane-polyether surfactant, relative to the total weight of the reaction system.

25. A viscoelastic polyurethane cellular thermoset material prepared from the reaction system of claim 16.

26. The viscoelastic polyurethane cellular thermoset material of claim 25, wherein the foaming agent consists of water optionally in combination with one or more dissolved or dispersed atmospheric gases.

27. A reaction system for the preparation of cellular viscoelastic polyurethane thermo set materials comprising:

(a) an organic monomeric polyisocyanate composition having a number averaged functionality of organically bound isocyanate groups of from 2 to 3 and a total concentration of organically bound isocyanate groups of from 28 to 35% by weight;

(b) an isocyanate reactive component comprising:
  (i) from 2 to 5% by weight of the total isocyanate reactive component of water;
  (ii) from 30 to 70% by weight of the total isocyanate reactive component of a polyoxyethylene based polyol having a combined nominal functionality of primary and secondary aliphatically bound hydroxyl groups of 2 to 3, a number averaged molecular weight of from 400 to 1500, and a number averaged equivalent weight of the combined primary and secondary aliphatically bound hydroxyl groups of from 300 to 550, wherein the polyoxyethylene based polyol is composed of greater than 90% by weight of oxyethylene units and at least 90 mole percent of the aliphatically bound hydroxyl groups are primary hydroxyl groups;
  (iii) from 30 to 70% by weight of the total isocyanate reactive component of a second polyoxyalkylene based polyol having a combined nominal functionality of primary and secondary aliphatically bound hydroxyl groups of 2 to 3, a number averaged molecular weight of from 400 to 1500, and a number averaged equivalent weight of the combined primary and secondary aliphatically bound hydroxyl groups of from 300 to 550, wherein the second polyoxyalkylene based polyol is composed of greater than 90% by weight of oxyalkylene units selected from the group consisting of oxypropylene units, oxytetramethylene units, and combinations of oxypropylene and oxytetramethylene units;
  (iv) from 0 to 20% by weight of the isocyanate reactive component of a polyoxypropylene or polyoxyethylene-polyoxypropylene polyol different from (b)(ii) and (b)(iii), having a combined nominal functionality of primary and secondary aliphatically bound hydroxyl groups of 2 to 3, and a number averaged equivalent weight of the combined primary and secondary aliphatically bound hydroxyl groups of from greater than 750 to 4000, wherein the polyoxypropylene or polyoxyethylene-polyoxypropylene polyol contains a weight ratio of oxyethylene to oxypropylene units of from 10:90 to 30:70;
  (v) from 0.15 to less than 3% by weight of the isocyanate reactive component of an organic polyol having a combined isocyanate reactive group functionality of 2 to 3 and an equivalent weight of isocyanate reactive groups of from 30 to less than 95, wherein the isocyanate reactive groups are limited to one or more members selected from the group consisting of primary aliphatic alcohol groups, secondary aliphatic alcohol groups, and aliphatic secondary amine groups and at least two of the isocyanate reactive groups are alcohol groups;

wherein the weight ratio of (b)(ii) to (b)(iii) is from 60:40 to 40:60, and the combined weight of (b)(ii) and (b)(iii) constitutes at least 85% by weight of the isocyanate reactive component;

(c) an optional surfactant;
(d) a catalyst; and
(e) an optional additive selected from the group consisting of dyes, pigments, internal mold release agents, physical blowing agents, chemical blowing agents, fire retardants, fillers, reinforcements, plasticizers, smoke suppressants, fragrances, antistatic agents, biocides, antioxidants, light stabilizers, adhesion promoters, and combinations of these;

wherein the ratio of organically bound isocyanate groups to the total of isocyanate reactive groups in the reaction system varies from greater than 0.8 to 0.95.

28. The reaction system of claim 27, wherein the total weight of the optional additive is less than 15% of the total weight of the reaction system.

29. The reaction system of claim 28, wherein the reaction system is essentially free of blowing agents other than water.

30. The reaction system of claim 28, wherein at least one of (b)(ii) and (b)(iii) has a nominal functionality of isocyanate-reactive groups of greater than 2.

31. The reaction system of claim 28, wherein at least one of (b)(ii) and (b)(iii) is a nominal triol.

32. The reaction system of claim 28, wherein both (b)(ii) and (b)(iii) are nominal triols.

33. The reaction system of claim 28, wherein the organic monomeric polyisocyanate composition has a number averaged functionality of isocyanate groups of greater than 2.1 and consists predominantly, on a weight basis, of one or more polyisocyanates of the MDI series.

34. The reaction system of claim 28, wherein the oxyalkylene units in the structure of (b)(iii) consist essentially of oxypropylene units.

35. The reaction system of claim 28, wherein the number averaged hydroxyl equivalent weight of (b)(ii) is in the range of from 350 to 500, and the number averaged hydroxyl equivalent weight of (b)(iii) is in the range of from 350 to 500.

36. The reaction system of claim 28, wherein the reaction system contains 0.25 to 2.5% by weight a polysiloxane-polyether surfactant, relative to the total weight of the reaction system.

37. A viscoelastic polyurethane cellular thermoset material prepared from the reaction system of claim 28.

38. The viscoelastic polyurethane cellular thermoset material of claim 37, wherein the foaming agent consists of water optionally in combination with one or more dissolved or dispersed atmospheric gases.

* * * * *